US012792853B1

(12) United States Patent
Tang et al.

(10) Patent No.: US 12,792,853 B1
(45) Date of Patent: Nov. 10, 2026

(54) RF SUBSYSTEM FOR RFID CHECKOUT SYSTEMS

(71) Applicant: Amazon Technologies, Inc., Seattle, WA (US)

(72) Inventors: Yuxing Tang, Bothell, WA (US); Frederick Hershel Savage, Austin, TX (US); Thomas Keenan, Seattle, WA (US); Nathan P. O'Neill, Snohomish, WA (US); Benjamin Powell Sukys, Seattle, WA (US); Aaron M. McDaniel, Seattle, WA (US); Snigdhendu Sekhar Mukhopadhyay, San Jose, CA (US); Abhishek Ramchandra Lolage, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/957,223

(22) Filed: Nov. 22, 2024

(51) Int. Cl.

| | |
|---|---|
| ***G06K 7/10*** | (2006.01) |
| ***G07G 1/00*** | (2006.01) |
| ***H04B 17/318*** | (2015.01) |

(52) U.S. Cl.
CPC ..... *G06K 7/10425* (2013.01); *G06K 7/10099* (2013.01); *G06K 7/10356* (2013.01); *G06K 7/10465* (2013.01); *G07G 1/009* (2013.01); *H04B 17/318* (2015.01)

(58) Field of Classification Search
CPC ........... G06K 7/10425; G06K 7/10099; G06K 7/10356; G06K 7/10465; G07G 1/009; H04B 17/318
See application file for complete search history.

(56) References Cited

U.S. PATENT DOCUMENTS

| | | | |
|---|---|---|---|
| 7,225,980 | B2 | 6/2007 | Ku et al. |
| 7,949,568 | B2 | 5/2011 | Fano et al. |
| 8,009,864 | B2 | 8/2011 | Linaker et al. |
| 8,175,925 | B1 | 5/2012 | Rouaix |
| 8,189,855 | B2 | 5/2012 | Opalach et al. |
| 8,423,431 | B1 | 4/2013 | Rouaix et al. |

(Continued)

FOREIGN PATENT DOCUMENTS

| | | | |
|---|---|---|---|
| CN | 207650931 | U | 7/2018 |
| JP | 2020064569 | A | 4/2020 |

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Vernal U Brown
(74) *Attorney, Agent, or Firm* — Athorus, PLLC

(57) ABSTRACT

Described are systems and methods for mobile radio frequency identification (RFID) exit systems that are configured to detect, read, and process RFID tags to facilitate transactions in a facility. The mobile RFID exit systems may be configured as an exit lane that detects and reads RFID tags affixed to items that may be purchased by customers shopping at a facility. The disclosed systems and methods may authenticate a customer, detect and read the RFID tags affixed to items selected by the customer, and process the purchase of the selected items, as the customer simply walks out of the facility with the selected items.

20 Claims, 20 Drawing Sheets

(56) References Cited

U.S. PATENT DOCUMENTS

| | | | | |
|---|---|---|---|---|
| 8,630,924 | B2 | 1/2014 | Groenevelt et al. | |
| 8,688,598 | B1 | 4/2014 | Shakes et al. | |
| 9,473,747 | B2 | 10/2016 | Kobres et al. | |
| 2003/0002712 | A1 | 1/2003 | Steenburgh et al. | |
| 2004/0181467 | A1 | 9/2004 | Raiyani et al. | |
| 2006/0022827 | A1 | 2/2006 | Higham | |
| 2008/0055087 | A1 | 3/2008 | Horii et al. | |
| 2008/0077511 | A1 | 3/2008 | Zimmerman | |
| 2008/0109114 | A1 | 5/2008 | Orita et al. | |
| 2009/0008441 | A1 | 1/2009 | Montgomery et al. | |
| 2009/0121017 | A1 | 5/2009 | Cato et al. | |
| 2009/0245573 | A1 | 10/2009 | Saptharishi et al. | |
| 2011/0011936 | A1 | 1/2011 | Morandi et al. | |
| 2012/0284132 | A1 | 11/2012 | Kim et al. | |
| 2013/0076898 | A1 | 3/2013 | Philippe et al. | |
| 2013/0253700 | A1 | 9/2013 | Carson et al. | |
| 2014/0279294 | A1 | 9/2014 | Field-Darragh et al. | |
| 2015/0019391 | A1 | 1/2015 | Kumar et al. | |
| 2015/0073907 | A1 | 3/2015 | Purves et al. | |
| 2016/0180314 | A1* | 6/2016 | Zemek | G06Q 20/4015 705/76 |
| 2016/0349352 | A1* | 12/2016 | Karani | H01Q 1/2216 |
| 2018/0247092 | A1* | 8/2018 | Khojastepour | G06K 7/10069 |
| 2019/0213572 | A1 | 7/2019 | Imamura et al. | |
| 2019/0331718 | A1* | 10/2019 | Cummings | G01R 29/0878 |
| 2021/0312146 | A1* | 10/2021 | Khojastepour | G06K 7/10029 |
| 2022/0050980 | A1 | 2/2022 | Miura et al. | |
| 2022/0188529 | A1 | 6/2022 | Markman et al. | |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

* cited by examiner

RF SUBSYSTEM FOR RFID CHECKOUT SYSTEMS

BACKGROUND

Traditional stores, retail establishments, and many other materials handling facilities typically include systems that facilitate conducting transactions (e.g., purchase, rental, etc.) in connection with items maintained by the stores and/or establishments. Such traditional systems typically require employees to handle (e.g., scanning, etc.) the items being purchased and operate the systems in performing the transactions. Self-checkout systems typically function in a similar manner, but require the customer, and not an employee, to handle the items being purchased and operate the system. More recently, self-checkout exit systems have been introduced, which can allow customers to simply select items they want to purchase and walk out of the facility. However, many self-checkout exits systems require significant infrastructure and are typically difficult to set up and install. In this regard, installing and setting up existing self-checkout exit systems oftentimes require several days (if not a week or more) and the hiring of contractors, electricians, and the like.

DETAILED DESCRIPTION

Figure 1:
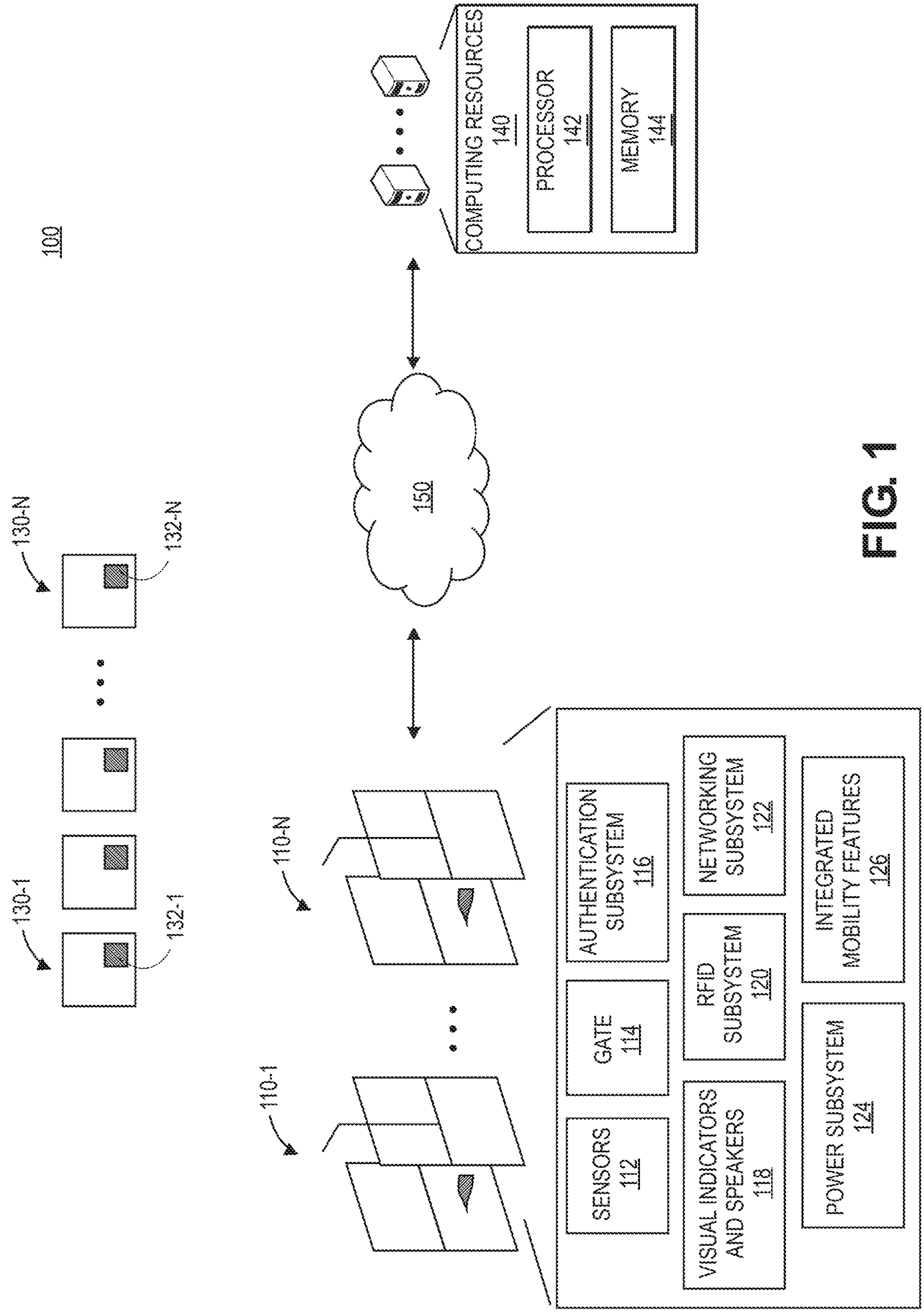
FIG. 1 is a block diagram illustrating an exemplary environment in which exemplary embodiments of the present disclosure may be implemented.

As is set forth in greater detail below, exemplary embodiments of the present disclosure are generally directed to mobile radio frequency identification (RFID) exit systems that are configured to detect, read, and process RFID tags to facilitate transactions in a retail facility or other material handling facilities, such as warehouses, fulfillment centers, retail establishments or other like facilities. In exemplary implementations, the mobile RFID exit systems may be configured as an exit lane that detects and reads RFID tags affixed to items that may be purchased by customers shopping at a retail facility or other material handling facilities. For example, after a customer has selected the items to be purchased, the customer may approach the mobile RFID exit system with the selected items. The mobile RFID exit system may then authenticate the customer, detect and read the RFID tags affixed to the items selected by the customer, and process the purchase of the selected items, as the customer simply walks out of the retail facility (or other material handling facilities) with the selected items.

In exemplary implementations, the mobile RFID exit system may be configured as one or more lanes through which customers may exit a retail facility (or other material handling facilities) while carrying the items selected for purchase. The exemplary mobile RFID exit system may include various subsystems and features to facilitate processing of transactions in a retail facility (or other material handling facilities), efficient installation of the exemplary mobile RFID exit system, and the like. For example, the exemplary mobile RFID exit system may include an authentication subsystem that may be configured to authenticate the customer that is accessing the mobile RFID exit system, a RFID subsystem configured to detect and read RFID tags affixed to items being transacted by the mobile RFID exit system, various sensors to detect customers using the mobile RFID exit system, visual indicators and/or speakers to assist customers using the mobile RFID exit system, mobility features to facilitate flexible and efficient placement and installation of the mobile RFID exit system, and power and networking subsystems to facilitate efficient installation of the mobile RFID exit system.

According to exemplary implementations, the authentication subsystem may include a computing device (e.g., a payment console or terminal, etc.) and one or more sensors and/or readers (e.g., near field communications "NFC", image sensors, optical sensor, etc.). In exemplary implementations, as the customer approaches the mobile RFID exit system, sensors (e.g., image sensors, motion sensors, beam break sensors, and the like) may detect the approaching customer and/or when the customer has entered the lane of the mobile RFID exit system. After detecting that the customer is in proximity to or in the lane of the mobile RFID exit system, the visual indicators and speakers may be activated to direct the customer to authenticate a payment method for the purchase of any selected items. Authenticating the customer may include interacting with sensors and/or readers of the authentication subsystem. For example, the customer may authenticate him/herself by scanning a QR code or a bar code using an image or optical sensor, interacting with a NFC reader using a mobile phone or other electronic device, and the like. The authentication subsystem may communicate with a third party payment processor to authenticate a payment method or instrument associated with the customer. After the customer has been authenticated, a gate may be unlocked, and the visual indicators and speakers may again be activated to direct the customer to pass through the gate and exit the retail facility (or other material handling facilities).

As the customer is walking through the mobile RFID exit system, the RFID subsystem may be configured to detect and read RFID tags affixed to items selected for purchase by the customer, as the customer walks through the mobile RFID exit system while carrying the items. The RFID subsystem may include one or more RFID reader antenna(s), one or more RFID validation tags, and RF blocking and/or attenuating components. Additionally, the RFID subsystem may include, or be in communication with, one or more computing devices configured to process information and parameters collected by the RFID subsystem. In exemplary implementations, the RFID reader antenna(s) may transmit an interrogator signal to read the RFID tags affixed to items located in the lane (e.g., being carried through the lane) of the mobile RFID exit system. The signal received from the RFID tags affixed to items located in the lane (e.g., being carried through the lane) of the mobile RFID exit system may be processed by the RFID subsystem to generate a cart for the items being carried through the mobile RFID exit system. The cart may then be processed using the authenticated payment method or instrument. Additionally, RF blocking and/or attenuating components may be arranged and configured to contain the RF energy within each respective lane of the mobile RFID exit system so that RFID tags located outside of the mobile RF exit system and/or in other lanes of the mobile RFID exit system are not errantly detected and read.

Further, the RFID subsystem may include RFID validation tags to facilitate verification and/or validation of the operation of the RFID subsystem. In exemplary implementations, the RFID validation tags may be positioned and arranged at particular locations relative to the RFID reader antenna(s). Accordingly, during verification and/or validation of the RFID subsystem, the RFID validation tags may be active, and the RFID reader antenna(s) may transmit an interrogator signal to read the RFID validation tags. The signal received from the RFID validation tags (e.g., signal strength, etc.) may be processed to determine that the RFID subsystem is operating in accordance with defined specifications. The verification and/or validation of the RFID subsystem may be performed upon initial installation of the mobile RFID exit system, on a periodic basis (e.g., based on time, number of transactions, etc.), and the like.

According to exemplary embodiments of the present disclosure, the exemplary mobile RFID exit system may also include various features and components to facilitate efficient transport, positioning, and/or installation of the mobile RFID exit system. For example, the mobile RFID exit system may include integrated caster wheels, or other mobility components, that may be selectively deployed to facilitate flexible positioning of the mobile RFID exit system. Further, the mobile RFID exit system may include a power module and a networking module configured for efficient set up and installation with minimal infrastructure requirements.

The systems and methods of the present disclosure may be utilized at any materials handling facilities. As used herein, the term "materials handling facility" may include, but is not limited to, warehouses, distribution centers, cross-docking facilities, order fulfillment facilities, packaging facilities, shipping facilities, rental facilities, libraries, retail stores or establishments, wholesale stores, museums, or other facilities or combinations of facilities for performing one or more functions of material or inventory handling for any purpose. The systems and methods of the present disclosure may also be utilized to locate objects within transportation centers, financial institutions or like structures in which diverse collections of people, items, objects or machines enter and exit from such environments at regular or irregular times or on predictable or unpredictable schedules. The exemplary mobile RFID exit system according to exemplary embodiments of the present disclosure can facilitate performing transactions at such facilities in an efficient manner.

FIG. 1 is a block diagram illustrating an exemplary environment 100 in which exemplary embodiments of the present disclosure may be implemented. For example, environment 100 may represent a simplified illustration of a retail facility (or other material handling facilities).

As shown in FIG. 1, environment 100 may include items 130 (e.g., items 130-1 through 130-N) and one or more mobile RFID exit systems 110 (e.g., mobile RFID exit systems 110-1 through 110-N) that communicates with computing resources 140 via network 150. Network 150 may include any wired or wireless network (e.g., the Internet, cellular, satellite, Bluetooth, Wi-Fi, etc.) that can facilitate communications between mobile RFID exit system 110 and computing resources 140. According to exemplary embodiments of the present disclosure, computing resources 140 may include a third party, such as a payment processor, or may include remote computing resources that form a portion of mobile RFID exit system 110. According to aspects of the present disclosure, computing resources 140 may include processor 142 and memory 144, which may be implemented via at least a portion of a networked computing system that may be configured to provide online applications, services, computing systems, servers, and the like. For example, computing resources 140 may provide various services and/or resources and do not require end-user knowledge of the physical premises and configuration of the system that delivers the services, such as "on-demand computing platforms," "software as a service (SaaS)," "infrastructure as a service (IaaS)," "platform as a service (PaaS)," "platform computing," "network-accessible platforms," "data centers," "virtual computing platforms," and so forth. In exemplary implementations computing resources 140 may form at least a portion of the cloud computing service. It is noted that computing environment 100 is a logical configuration and is not necessarily an actual configuration. Indeed, there may be numerous ways in which computing environment 100 may be implemented, and FIG. 1 should be viewed as illustrative and not limiting.

Each item 130 may include an RFID tag 132 (e.g., RFID tags 132-1 through 132-N) affixed thereon, so that mobile RFID exit systems 110 can detect, read, and process RFID tags 132 affixed to items 130 to process transactions for items 130. For example, mobile RFID exit system 110 may be deployed in a retail facility (or other material handling facilities) and items 130 may be items that are available for purchase at the retail facility (or other material handling facilities). In use, a user or customer may enter the retail facility (or other material handling facilities), select one or more items 130, and exit the retail facility (or other material handling facilities) via mobile RFID exit system 110 while carrying one or more items 130, which the user has selected for purchase. In exemplary embodiments, mobile RFID exit system 110 may be configured as a lane to process transactions for the selected items as the user walks through mobile RFID exit system 110 to exit the retail facility (or other material handling facilities).

As illustrated, mobile RFID exit system 110 may include sensors 112, gate 114, authentication subsystem 116, visual indicators and speakers 118, RFID subsystem 120, networking subsystem 122, power subsystem 124, and integrated mobility features 126. In exemplary implementations, mobile RFID exit system 110 may be configured for efficient and flexible placement, set up, and installation. As described in further detail herein in connection with at least FIGS. 3, 7A, 7B, and 8, networking subsystem 122, power subsystem 124, and/or integrated mobility features 126 of mobile RFID exit system 110 may facilitate the efficient and flexible placement, set up, and installation of mobile RFID exit system 110. In exemplary implementations, integrated mobility features 126 may include one or more caster wheels or other mechanism that may be integrated into mobile RFID exit system 110 and selectively deployed for moving and/or positioning mobile RFID exit system 110. For example, the caster wheels may include a jack or other mechanism by which the caster wheels may be deployed from a retracted position so that mobile RFID exit system 110 may be moved and/or positioned in a desired location. After placement of mobile RFID exit system 110, the jack may facilitate retracting the caster wheels back into mobile RFID exit system 110.

Additionally, networking subsystem 122 and power subsystem 124 may facilitate efficient and simple set up and bring up of mobile RFID exit system 110. For example, networking subsystem 122 may include a wireless access point that may be pre-configured for a wireless network that may be deployed in connection with mobile RFID exit system 110. According to certain aspects of the present disclosure, networking subsystem 122 may facilitate remote bring-up, troubleshooting, etc. of mobile RFID exit system 110. In connection with set up, installation, and bring up of mobile RFID exit system 110, RFID subsystem 120 may include one or more RFID validation tags that are positioned and arranged at particular locations relative to the RFID reader antenna(s) included in RFID subsystem 120. Accordingly, during verification and/or validation of the RFID subsystem, the RFID validation tags may be active, and the RFID reader antenna(s) may transmit an interrogator signal to read the RFID validation tags. The signal received from the RFID validation tags (e.g., signal strength, etc.) may be processed (e.g., locally or by computing resources 140) to determine that RFID subsystem 122 is operating in accordance with defined specifications. The RFID validation tags may also be used to troubleshoot the operation of RFID subsystem 120 and/or periodically confirm that RFID subsystem 122 is operating in accordance with defined specifications. Further, power subsystem 124 may be configured such that each mobile RFID exit system 110 may be powered via a single AC cable. Mobile RFID exit system 110 may further include features such as cable raceways to facilitate simple and efficient routing of cables. Accordingly, the various features and subsystems of mobile RFID exit system 110 can facilitate simple and efficient positioning, installation, and set-up, without requiring contractors, electricians, and the like.

After placement, installation, and bring up of mobile RFID exit system 110, the various subsystems and components of mobile RFID exit system 110 may facilitate efficient detection and reading of RFID tags 132 associated with items 130 to process transactions in connection with items 130. In exemplary implementations, sensors 112 may include one or more sensors, such as imaging sensors, beam break and/or motion sensors (e.g., infrared (IR), optical, etc.), and the like, to detect and monitor users relative to mobile RFID exit system 110 to facilitate processing transactions for items 130 that the user is carrying through mobile RFID exit system 110. For example, sensors 112 may detect and monitor users as they approach mobile RFID exit system 110, enter mobile RFID exit system 110, walk through mobile RFID exit system 110, and/or exit mobile RFID exit system 110. In an exemplary implementation, imaging sensors of sensors 112 may detect a user approaching mobile RFID exit system 110 and/or track the movement of a user through the lane of mobile RFID exit system 110. Additionally, sensors 112 may include one or more beam break sensors configured to detect the movement of a user through the lane of mobile RFID exit system 110. In an exemplary implementation, mobile RFID exit system 110 may include a first beam break sensor positioned proximate the entrance of the lane of mobile RFID exit system 110, a second beam break sensor positioned proximate gate 114 of mobile RFID exit system 110, and a third beam break sensor positioned proximate the exit of the lane of mobile RFID exit system 110. Accordingly, the three beam break sensors may monitor movement of the user through mobile RFID exit system 110 to facilitate processing of transactions for items 130 selected and carried through mobile RFID exit system 110 by the user.

Additionally, authentication subsystem 116 may include a computing device (e.g., a payment console or terminal, etc.) and one or more sensors and/or readers (e.g., near field communications “NFC”, image sensors, optical sensor, etc.) that are configured to authenticate a payment method and/or instrument associated with users utilizing mobile RFID exit system 110. For example, authentication subsystem 116 may be configured to read a payment instrument such as a debit card, credit cart, mobile wallet, electronic payment service (e.g., Venmo, PayPal, etc.) via a NFC reader, magnetic reader, card chip reader, and the like, and request authorization, via networking subsystem and network 150 for the read payment instrument (e.g., via network 150) from a third-party payment processor (which may be executing on computing resources 140). Optionally, authentication subsystem 116 may include an optical reader configured to read a QR code, barcode, and the like, to identify a loyalty, rewards, or other membership associated with the user and the retail facility (or other material handling facilities) and a payment instrument associated with any such loyalty, rewards, or other membership, so that any such identified payment instrument may be authenticated.

After a payment method or instrument has been authenticated, gate 114 may be unlocked and/or opened so that the user may walk through mobile RFID exit system 110 to exit the retail facility (or other material handling facilities). As the user is walking through mobile RFID exit system 110, any items 130 that the user may be carrying may be processed by mobile RFID exit system 110. For example, as the user walks through mobile RFID exit system 110 (after a payment method or instrument has been authenticated), RFID subsystem 120 may include RFID reader antennas and RFID readers configured to detect and read RFID tags 132 affixed to any items 130 located in the lane (e.g., being carried by the user through the lane) of mobile RFID exit system 110. RFID subsystem 120 may include one or more RFID reader antenna(s) and RFID tag readers to detect and read product information and obtain parameters, such as signal strength information, changes in signal strength information (e.g., at each RFID reader antenna, etc.), etc., associated with RFID tags 132 affixed to any items 130 located in the lane (e.g., being carried by the user through the lane) of mobile RFID exit system 110. In exemplary implementations, the RFID reader antenna(s) may transmit an interrogator signal to read RFID tags 132 affixed to items 130 located in the lane of and/or being carried through the lane of mobile RFID exit system 110. The signal received from RFID tags 132 affixed to items 130 located in the lane of and/or being carried through the lane of mobile RFID exit system 110 may be processed to generate a cart for items 130 being carried through mobile RFID exit system 110. For example, the parameters, such as signal strength information, changes in signal strength information (e.g., at each RFID reader antenna, etc.) as the user proceeds through the lane of mobile RFID exit system 110, and the like, may be processed to determine which RFID tags 132 are in the lane of mobile RFID exit system 110 and which RFID tags 132 are outside the lane of mobile RFID exit system 110. RFID tags 132 that are outside of the lane of mobile RFID exit system 110 (e.g., in an adjacent lane, somewhere else in the facility, etc.) but are detected and read may be considered to be errant detections and reads of RFID tags 132 that should not be processed in connection with the user in the lane of mobile RFID exit system 110. Accordingly, a cart that includes items associated with RFID tags 132 determined to be within the lane of mobile RFID exit system 110 may be generated. For example, the product information encoded on RFID tags 132 may include a price, product description, etc. Alternatively and/or in addition, the product information may be used to query a database (e.g., local, in communication with computing resources 140, etc.) to obtain other product information such as pricing, product description, and the like, in connection with generating the cart.

In generating the cart, RFID subsystem 120 may include, or be in communication with, one or more computing devices (e.g., locally, computing resources 140, etc.) configured to process the information and parameters collected by RFID subsystem 120 in connection with RFID tags 132 affixed to items 130 being carried through mobile RFID exit system 110. The cart may then be processed using the payment method or instrument authenticated by authentication subsystem 116. Additionally, RFID subsystem 120 may include RF blocking and/or attenuating components that are arranged and configured to contain the RF energy within each respective lane of mobile RFID exit system 110 so that RFID tags 132 located outside of mobile RFID exit system 110 and/or in other lanes of mobile RFID exit system 110 are not errantly detected and read.

In connection with a user utilizing mobile RFID exit system 110, visual indicators and speakers 118 may have various illumination and/or indication states and may work in conjunction with the various other subsystems and components of mobile RFID exit system 110 to assist users as they walk through mobile RFID exit system 110 with any items 130 they intend to purchase. For example, after sensors 112 detect that a user has entered, or is about to enter, mobile RFID exit system 110, visual indicators and speakers 118 may be activated to direct the user's attention to a console or terminal of authentication substation 116 so that the user may authenticate a payment method or instrument associated with the user for use in connection with the upcoming transaction. After a payment method or instrument is authenticated, visual indicators and speakers 118 may direct the user to walk through mobile RFID exit system 110 to exit the retail facility (or other material handling facilities). The visual indicators may include, for example, different colored lights, animations implemented via lighting patterns, and the like, and the speaker may emit audio indicators (e.g., spoken directions, beeps, etc.) to direct users to each next action to be taken as the user exits through mobile RFID exit system 110.

Figure 2A:
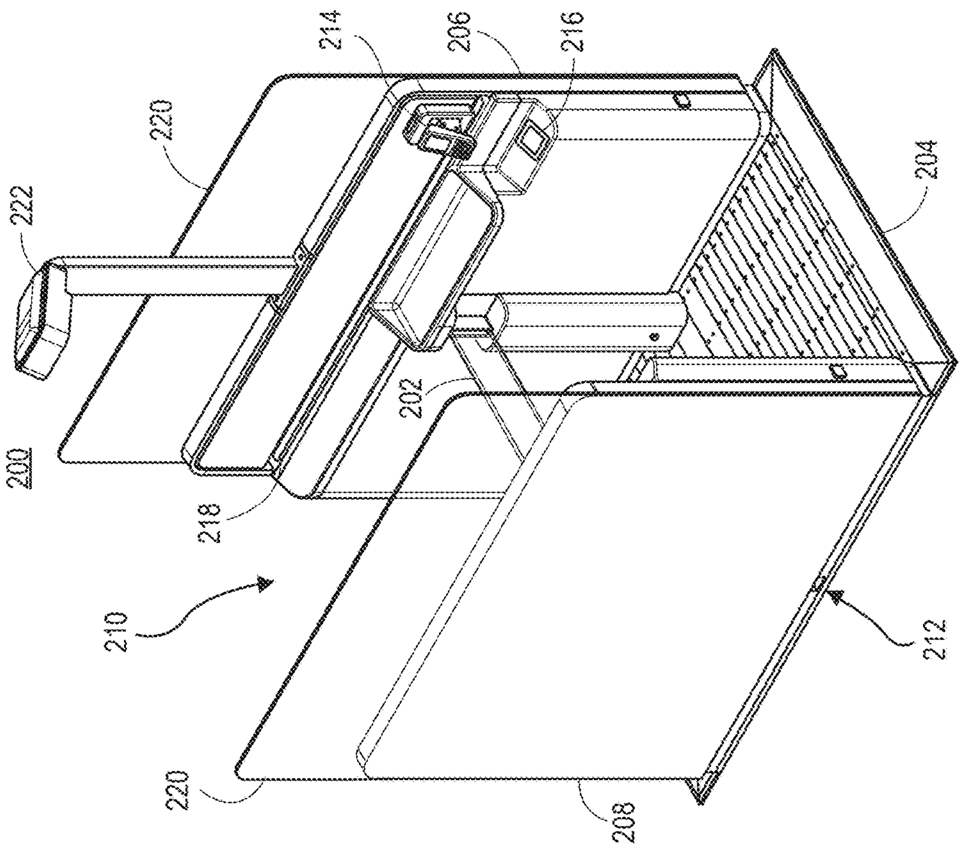
FIGS. 2A-2C are illustrations of an exemplary mobile RFID exit system, according to exemplary embodiments of the present disclosure.
Figure 2B:
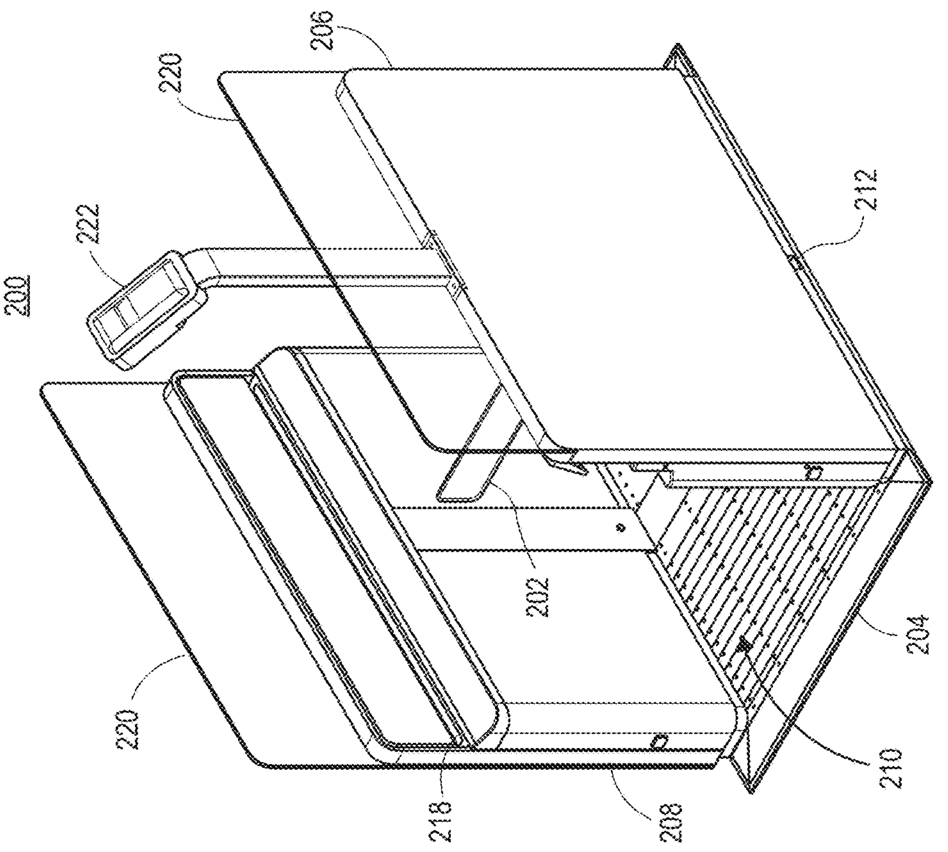
Figure 2C:
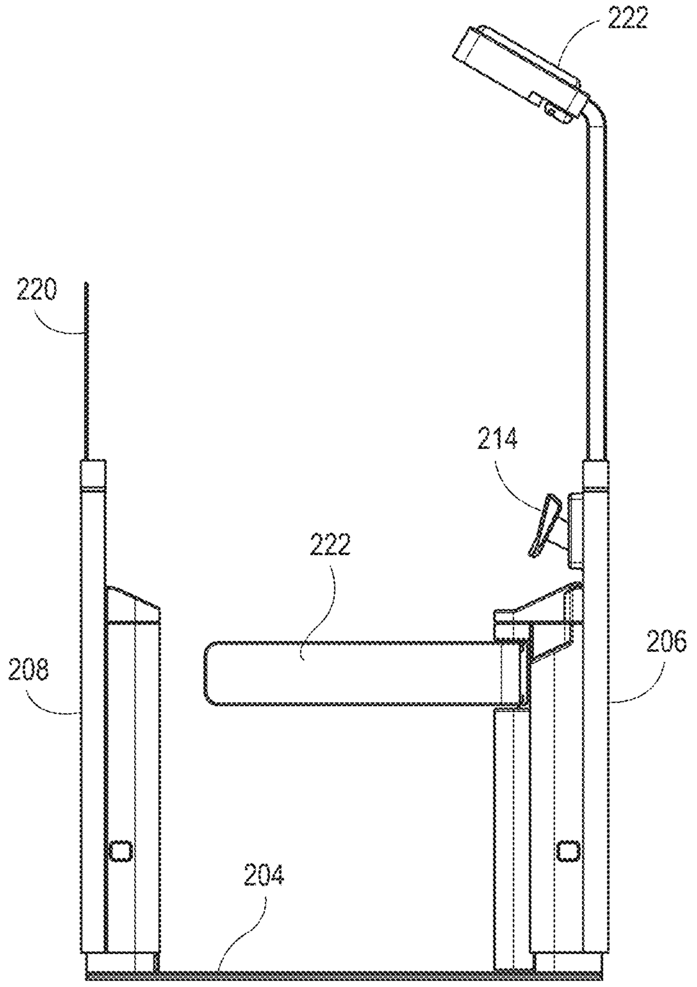

FIGS. 2A-2C are illustrations of an exemplary mobile RFID exit system 200, according to exemplary embodiments of the present disclosure. Mobile RFID exit system 200 may be substantially similar to mobile RFID exit system 110 illustrated in FIG. 1. In exemplary implementations, multiple mobile RFID exit systems 200 may be installed (e.g., side by side, etc.) at a facility to form multiple checkout exit lanes for the facility. Further, according to certain aspects of the present disclosure, mobile RFID exit system 200 may be implemented in any facility (e.g., as an alternative check-out option, etc.).

As shown in FIGS. 2A-2C, mobile RFID exit system 200 may include gate 202, lane floor support structure 204, first lane enclosure 206, and second lane enclosure 208. First lane enclosure 206, second lane enclosure 208, and lane floor support structure 204 may be configured and arranged to form lane 210 therethrough, and gate 202 may be coupled to either first lane enclosure 206 or second lane enclosure 206 and selectively unlocked and/or opened to provide access for a user to walk through lane 210. For example, as a user utilizes mobile RFID exit system 200 to exit a facility, gate 202 may be unlocked and/or opened after a payment instrument or method is authorized to allow the user to walk through lane 210 to exit the facility. Accordingly, mobile RFID exit system 200 may detect and read RFID tags affixed to any items the user may be carrying as the user walks through lane 210 so that mobile RFID exit system 200 can generate a cart of the items and process a transaction for the items using the authorized payment method.

In the exemplary implementation illustrated in illustrated in FIGS. 2A-2C, floor support structure 204, first lane enclosure 206, and second lane enclosure 208 may be arranged and configured to substantially form a U-shaped configuration. For example, first lane enclosure 206 and second lane enclosure 208 may be coupled to floor support structure 204 such that they are substantially parallel to each other and substantially perpendicular to floor support structure 204. According to aspects of the present disclosure, floor support structure 204 may include cable raceway 212, one or more stiffening structures, and a floor surface. Cable raceway 212 may be dimensioned and designed to receive and organize cables (e.g., AC power cable, networking cable, etc.) from one or more mobile RFID exit systems 200 installed together at a facility. The stiffening structures may include one or more ribs, beams, etc., which can be arranged in geometric arrangements (e.g., triangles, honeycomb pattern, and the like) to provide bending and torsional rigidity to floor support structure 204, so as to maintain first lane enclosure 206 and second lane enclosure 208 in the U-shaped configuration. According to certain aspects of the present disclosure, floor support structure 204 may include two stiffening structures positioned and arranged on either side of cable raceway 212. Further, the floor surface may conceal cable raceway 212 and the stiffening structures and provide a surface on which users of mobile RFID exit system 200 may walk as they pass through mobile RFID exit system 200 to exit a facility, such as a retail facility or other material handling facilities, in which mobile RFID exit system 200 is installed.

As illustrated, first lane enclosure 206 may include gate 202, payment terminal 214, optical scanner 216, visual indicator/speaker 218, RF shield 220, and arm 222, and second lane enclosure 208 may include visual indicator/speaker 218 and RF shield 220. Alternatively and/or in addition, one or more of gate 202, payment terminal 214, optical scanner 216, and arm 222 may be included in second lane enclosure 208, rather than in first lane enclosure 206. First lane enclosure 206, second lane enclosure 208, and arm 222 may include additional internal components (e.g., RFID reader antennas, RFID tag readers, RFID validation tags, tamper detection components, RF energy attenuating components, networking components, etc.), which are described in further detail herein in connection with at least FIGS. 3, 4A-4H, and 8.

In exemplary implementations, payment terminal 214 and optical scanner 216 may form at least a portion of an authorization subsystem that is configured to authorize a payment method or instrument associated with a user of mobile RFID exit system 200. The authorized payment method or instrument may be used to process a transaction for any items the user may be carrying through mobile RFID exit system 200. For example, payment terminal 214 may include one or more sensors and/or readers, such as an NFC reader, a magnetic reader, a card chip reader, and the like, to read a payment instrument such as a debit card, credit cart, mobile wallet, electronic payment service (e.g., Venmo, PayPal, etc.), and the like. Alternatively and/or in addition, optical scanner 216 may be configured to read a QR code, barcode, and the like, to identify a loyalty, rewards, or other membership associated with the user and the facility in which mobile RFID exit system 200 is deployed and a payment instrument associated with any such loyalty, rewards, or other membership, so that any such identified payment instrument may be authenticated by the authentication subsystem.

Additionally, visual indicator/speaker 218 may be configured to assist and direct users of mobile RFID exit system 200 with visual and/or audio cues. In exemplary implementations, visual indicators/speakers 218 may include one or more light bars that extend the length of first lane enclosure 206 and second lane enclosure 208 and have multiple illumination states (e.g., colors, patterns, animations, etc.) and/or one or more speakers that can be activated to visual and/or audio cues to indicate a status of mobile RFID exit system 200, a status of authentication of a payment method or instruction, a status of identification of a loyalty, rewards, or other membership account, to provide direction to the user as to use of mobile RFID exit system 200, and the like. The visual and audio indicators are described in further detail herein in connection with at least FIG. 6.

As shown in FIGS. 2A-2C, each of first lane enclosure 206 and second lane enclosure 208 may include RF shields 220. RF shields 220 may work in conjunction with other RF absorbing and/or attenuating components to attenuate and/or block RF energy so as to contain the RF energy within mobile RFID exit system 200, as well as prevent RF energy from neighboring mobile RFID exit systems to enter mobile RFID exit system 200. This can prevent, for example, errantly detecting and reading RFID tags that are located outside mobile RFID exit system 200. Preferably, RF shields 220 are made from transparent materials to prevent a closed-in and/or claustrophobic feeling from within mobile RFID exit system 200, thereby improving the user experience of mobile RFID exit system 200. For example, RF shields 220 may include a transparent RF shielding film attached to a transparent panel. RF shields 220, as well as other RF absorbing and/or attenuating components, are described in further detail herein in connection with at least FIGS. 4A-4H.

Figure 3:
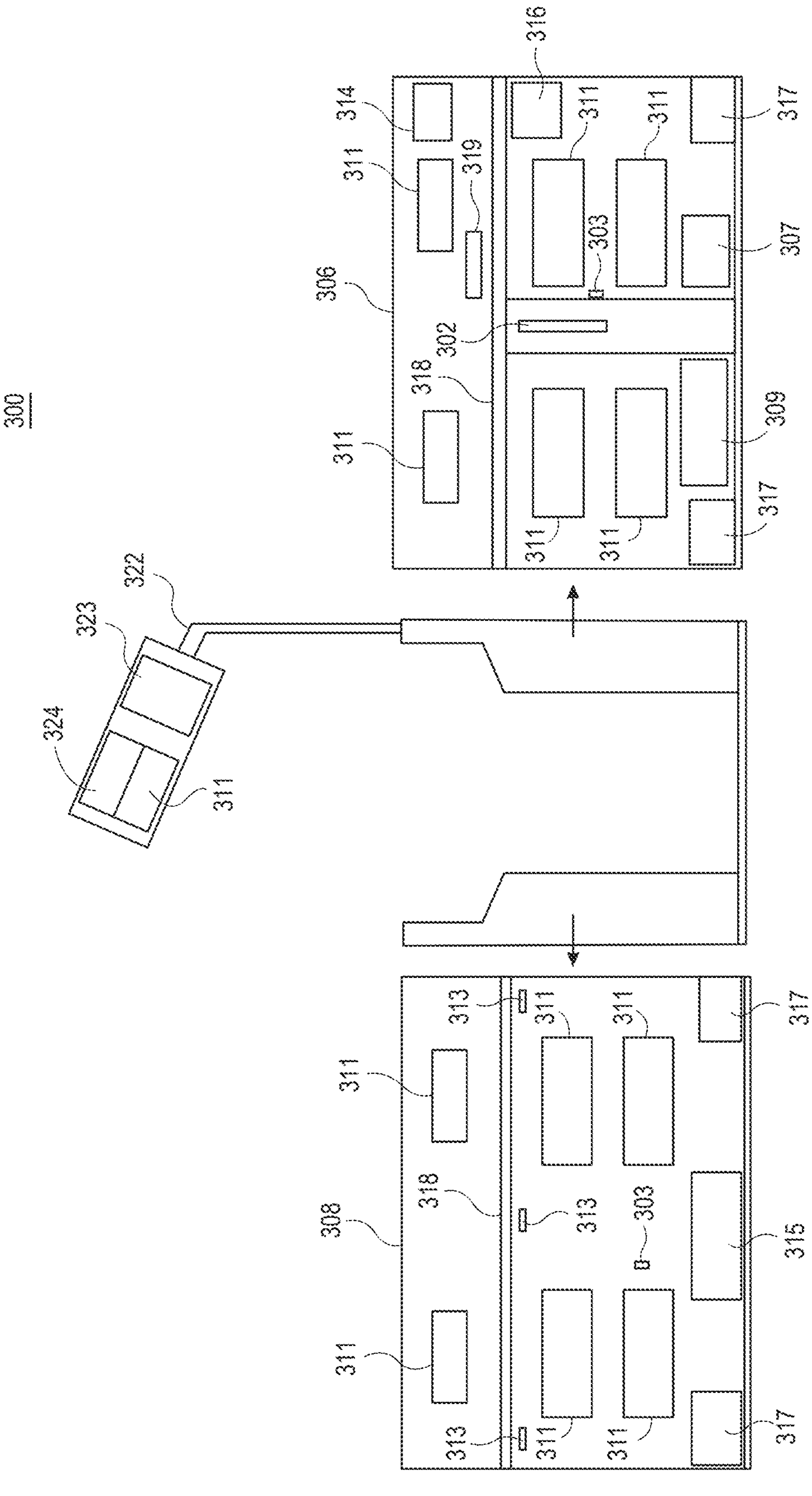
FIG. 3 is a block diagram of an exemplary mobile RFID exit system, according to exemplary embodiments of the present disclosure.

FIG. 3 is a block diagram of an exemplary mobile RFID exit system 300, according to exemplary embodiments of the present disclosure. Mobile RFID exit system 300 may be substantially similar to mobile RFID exit system 110 illustrated in FIG. 1 and mobile RFID exit system 200 illustrated in FIGS. 2A-2C. In exemplary implementations, multiple mobile RFID exit systems 300 may be installed (e.g., side by side, etc.) at a facility to form multiple checkout exit lanes for the facility. Further, according to certain aspects of the present disclosure, mobile RFID exit system 300 may be implemented in any facility (e.g., as an alternative check-out option, etc.).

As shown in FIG. 3, mobile RFID exit system 300 includes first lane enclosure 306, second lane enclosure 308, and arm 322. Mobile RFID exit system 300 may be configured to process transactions at a facility, such as a retail facility or other material handling facilities, by automatically processing a transaction for items that a user may be purchasing. For example, mobile RFID exit system 300 may authenticate a payment method associated with a user, detect and read the RFID tags affixed to the items selected by the user to generate a cart of selected items, and process the purchase of the selected items, as the customer simply walks out of the facility with the selected items. While FIG. 3 illustrates an exemplary implementation where certain components are included in first lane enclosure 306, second lane enclosure 308, and arm 322, it should be understood that the inclusion of various features and components of mobile RFID exit system 300 in first lane enclosure 306, second lane enclosure 308, and arm 322 is not limited thereto. Accordingly, the features and components included in first lane enclosure 306 may alternatively or additionally be included in second lane enclosure 308 and/or arm 322, the features and components included in second lane enclosure 308 may alternatively or additionally be included in first lane enclosure 306 and/or arm 322, and the features and components included in arm 322 may alternatively or additionally be included in first lane enclosure 306 and/or second lane enclosure 308.

As shown in FIG. 3, first lane enclosure 306 may include gate 302, one or more tamper sensors 303, networking gateway 307, power supply 309, one or more RFID reader antennas 311, payment terminal 314, optical scanner 316, mobility devices 317, visual indicator 318, and speaker 319. Additionally, second lane enclosure 308 may include one or more tamper sensors 303, one or more RFID reader antennas 311, one or more beam break sensors 313, RFID tag readers 315, and mobility devices 317. Arm 322 may include one or more RFID reader antennas 311, image sensor 323, and networking access point 324. The various components of mobile RFID exit system 300 allow mobile RFID exit system 300 to process transactions for items by detecting and reading RFID tags affixed to the items as a user walks through mobile RFID exit system 300.

According to aspects of the present disclosure, mobility devices 317 may be selectively deployed for moving and/or positioning mobile RFID exit system 300. In an exemplary implementation, mobility devices 317 may include caster wheels that may be extended or retracted via a jack mechanism. Accordingly, mobility devices 317 may be deployed from a retracted position to an extended position via the jack mechanism in preparation to move mobile RFID exit system 300. Mobile RFID exit system 300 may then be moved or positioned using mobility devices 317, and once mobile RFID exit system 300 is in the desired location or position, mobility devices 317 may be retracted using the jack mechanism. Further, tamper sensors 303 may be configured to indicate whether unauthorized access to first lane enclosure 306 and second lane enclosure 308 had occurred. For example, each tamper sensor 303 may include a pair of magnets (e.g., a first magnet disposed within first lane enclosure 306 or second lane enclosure 308 and a second magnet disposed on a cover or case enclosing first lane enclosure 306 or second lane enclosure 308) and a tamper event may be recorded and stored in the event that the pair of magnets is separated by more than a threshold distance. Accordingly, any tamper events recorded by tamper sensors 303 may be reviewed upon powering of mobile RFID exit system 300.

In addition to recording potential tamper events, tamper sensors 303 may include a plunger type switch to ensure that first lane enclosure 306 or second lane enclosure 308 are properly closed up. For example, the plunger switch can trigger an alert in the event that the cover or case enclosing first lane enclosure 306 or second lane enclosure 308 are not properly secured and mobile RFID exit system 300 was not placed in a maintenance that allows for removal of the case enclosing first lane enclosure 306 or second lane enclosure 308 for maintenance.

Power supply 309 and networking gateway 307 may facilitate efficient and simple set up and bring up of mobile RFID exit system 300. For example, power supply 309 may include a uninterruptable power supply (UPS) employing a supercapacitor (rather than a battery) to avoid shipping restrictions that are in place for certain batteries and may be configured to have a single power cable that can simply be plugged into a standard 120 volt or 240 volt outlet. Additionally, networking gateway 307 may be in communication with networking access point 324 that may be pre-configured for a wireless network that may be deployed in connection with mobile RFID exit system 300. Accordingly, such features and components may facilitate efficient placement, installation, and set up of mobile RFID exit system 300.

As illustrated in FIG. 3, beam break sensors 313 and image sensor 323 may detect and monitor users relative to mobile RFID exit system 300 to facilitate processing transactions for items that the user is carrying through mobile RFID exit system 300. For example, beam break sensors 313 and image sensor 323 may detect and monitor users as they approach mobile RFID exit system 300, enter mobile RFID exit system 300, walk through mobile RFID exit system 300, and/or exit mobile RFID exit system 300. In an exemplary implementation, mobile RFID exit system 300 may include three beam break sensors 313, e.g., a first beam break sensor 313 positioned proximate an entrance of mobile RFID exit system 300, a second beam break sensor 313 positioned proximate gate 302 of mobile RFID exit system 300, and a third beam break sensor 313 positioned proximate an exit of mobile RFID exit system 300, detect and/or monitor the movement of a user through the lane of mobile RFID exit system 300. Imaging sensor 323 may also detect a user approaching mobile RFID exit system 300 and/or track the movement of a user through the lane of mobile RFID exit system 300. Accordingly, beam break sensors 313 and image sensor 323 may monitor movement of the user through mobile RFID exit system 300 to facilitate processing of transactions for items selected and carried through mobile RFID exit system 300 by the user.

Additionally, payment terminal 314 and optical scanner 316 may form at least a portion of an authorization subsystem that is configured to authorize a payment method or instrument associated with a user of mobile RFID exit system 300. The authorized payment method or instrument may be used to process a transaction for any items the user may be carrying through mobile RFID exit system 300. For example, payment terminal 314 may include one or more sensors and/or readers, such as an NFC reader, a magnetic reader, a card chip reader, and the like, to read a payment instrument such as a debit card, credit cart, mobile wallet, electronic payment service (e.g., Venmo, PayPal, etc.), and the like. Alternatively and/or in addition, optical scanner 316 may be configured to read a QR code, barcode, and the like, to identify a loyalty, rewards, or other membership associated with the user and the facility in which mobile RFID exit system 300 is deployed and a payment instrument associated with any such loyalty, rewards, or other membership, so that any such identified payment instrument may be authenticated by the authentication subsystem. After payment information has been received via payment terminal 314 and/or optical scanner 316, the payment information may be transmitted (e.g., via network gateway 307 and/or network access point 324) to payment processor to obtain authentication of the payment method provided by the user. After the payment method has been authenticated, gate 302 may be unlocked and/or opened so that the user may walk through mobile RFID exit system 300 to exit the facility in which mobile RFID exit system 300 is located.

As the user walks through mobile RFID exit system 300 with one or more items for purchase, RFID reader antennas 311 and RFID readers 315 may detect and read RFID tags affixed to any items that the user is carrying through mobile RFID exit system 300. For example, RFID reader antennas 311 may transmit an interrogator signal to detect and read the RFID tags affixed to items located in the lane (e.g., being carried through the lane) of mobile RFID exit system 300. In exemplary implementations, RFID reader antennas 311 and RFID reader 315 may receive RF signals from RFID tags responding to the interrogator signal. The RF signals may include product information, such as electronic product codes (EPCs), that are encoded in the RFID tags. Additionally, the RF signals received by RFID reader antennas 311 and RFID reader 315 from the RFID tags may be processed to determine other information and/or parameters associated with the received RF signals, such as received signal strength indicator (RSSI), and the like. The product information and the other information and/or parameters (e.g., RSSI), and a user's movement through mobile RFID exit system 300 (e.g., as detected and monitored by beam break sensors 313 and imaging sensor 323) may be processed to generate a cart for the user moving through mobile RFID exit system 300. For example, the product information encoded in the received signals, the RSSI of the received signals, the movement of the user through mobile RFID exit system 300, the change in the RSSI of the received signals as a function of the user's movement through mobile RFID exit system 300 (as measured by one or more RFID reader antennas 311), times at which the signals were received and the associated RSSI values, and the like may be processed (e.g., by a trained machine learning model, using a rule-based algorithm, etc.) to generate a cart. Generation of the cart may be performed locally or remotely. Preferably the cart includes items associated with RFID tags that the system predicts are being carried through mobile RFID exit system 300 and excludes items associated with RFID tags that were detected and/or read, and the system predicts are outside of mobile RFID exit system 300 (e.g., RFID tags in different lanes, RFID tags outside of mobile RFID exit system 300, etc.). The cart may then be processed using the authenticated payment method or instrument.

In exemplary implementations of the present disclosure, visual indicators 318 and speaker 319 may be configured to indicate a status of mobile RFID exit system 300 and/or assist and direct users of mobile RFID exit system 300 with visual and/or audio cues. According to exemplary embodiments of the present disclosure, visual indicators 318 can include one or more light bars (e.g., LED light bars, etc.) that extend the length of first lane enclosure 306 and second lane enclosure 308 and are configured to change colors and provide animations as visual indicators to users of mobile RFID exit system 300. For example, when mobile RFID exit system 300 is available for use, the entire length of the light bars comprising visual indicators 318 may be illuminated using a first color, such as white. Optionally, visual indicators 318 may be illuminated with an animation (e.g., a breathing pattern, a pulsing pattern, etc.). Alternatively and/or in addition, if mobile RFID exit system 300 is not available for use (e.g., a fault is detected or otherwise inoperable), the entire length of the light bars comprising visual indicators 318 may be illuminated using a second color, such as red. Optionally, visual indicators 318 may be illuminated with an animation (e.g., a breathing pattern, a pulsing pattern, etc.).

In addition to communicating a status of mobile RFID exit system 300, visual indicators 318 may also be configured to assist users of mobile RFID exit system 300. For example, the illumination pattern of visual indicators 318 may change once a user enters mobile RFID exit system 300 to indicate to the user that mobile RFID exit system 300 has detected the user and is ready to process a transaction in connection with the user. Additionally, visual indicators 318 may illuminate different illumination patterns (e.g., solid, pulsing, flashing, etc.) and/or different colors (e.g., white, red, blue, green, etc.) to communicate various states to the user. For example, the different illumination patterns and/or colors can represent that the user is to authenticate a payment method, that authentication of the payment method was successful or unsuccessful, that a loyalty, rewards, or other membership account was identified, that gate 302 is unlocked and the user can proceed to exit mobile RFID exit system 300, and the like.

In addition to visual indicators 318, speaker 319 may also provide audio indicators to communicate a status of mobile RFID exit system 300 and/or to provide assistance to a user of mobile RFID exit system 300. For example, if mobile RFID exit system 300 is available for use, a chime, welcome message, or the like may be played via speaker 319 to communicate to the user that mobile RFID exit system 300 has detected the user and is ready to process a transaction in connection with the user. Additionally, audio indicators (e.g., chimes, tones, messages, etc.) may be played via speaker 319 to instruct and/or communicate to the user to authenticate a payment method, that authentication of a payment method was successful or unsuccessful, that gate 302 is unlocked, to proceed to exit mobile RFID exit system 300, and the like.

Figure 4A:
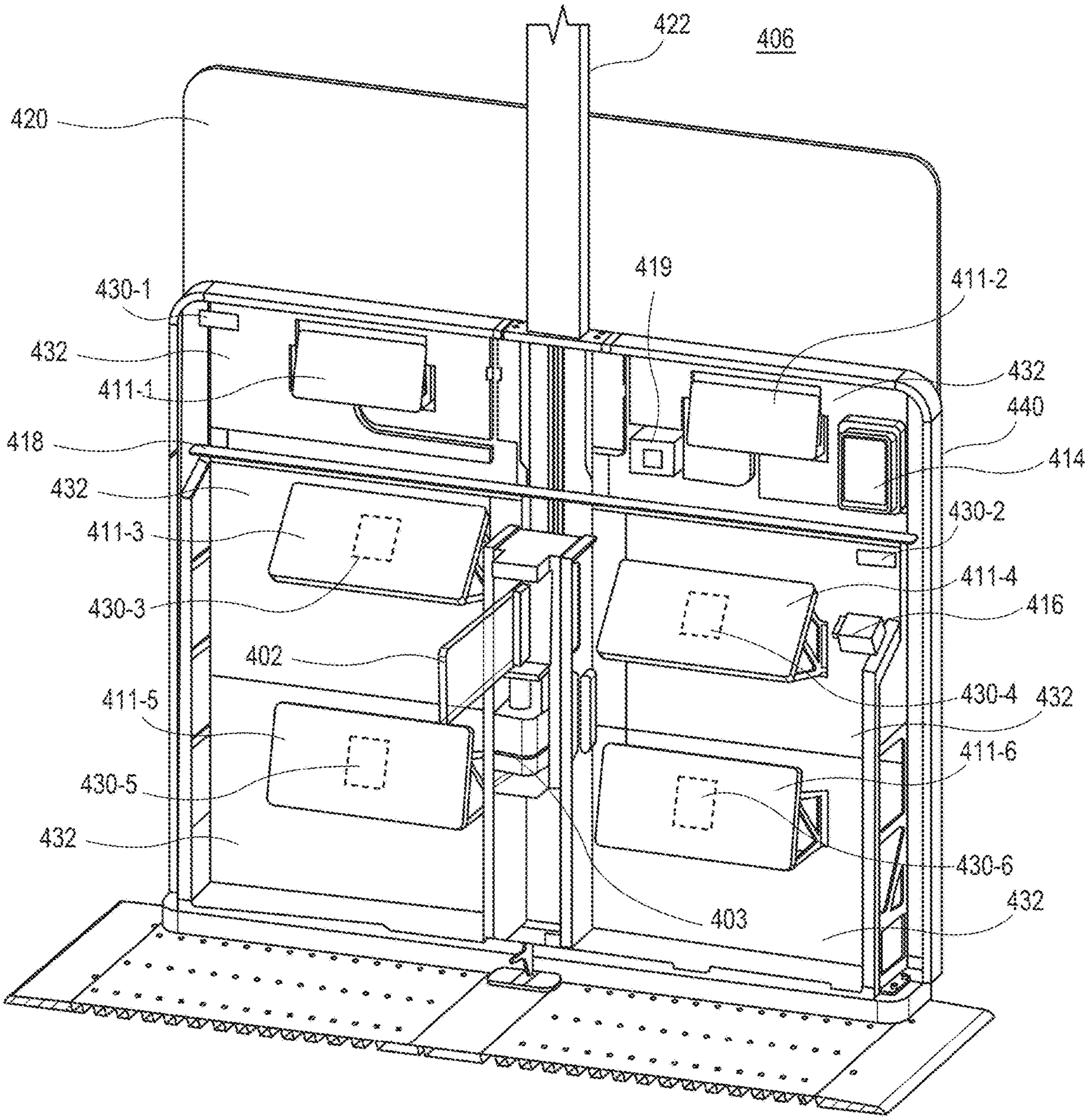
FIGS. 4A-4H are illustrations of exemplary features of an exemplary mobile RFID exit system, according to exemplary embodiments of the present disclosure.
Figure 4B:
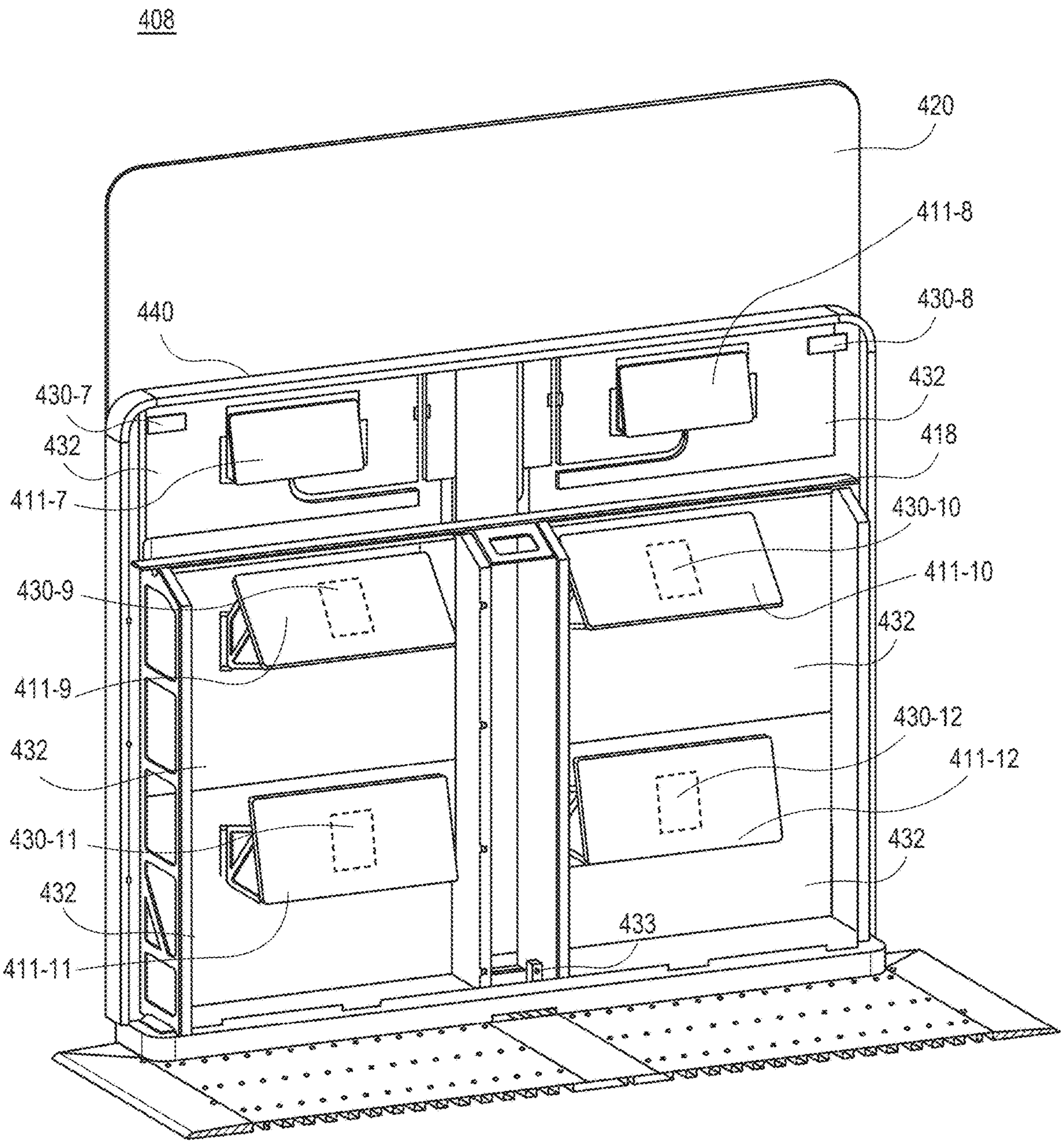
Figure 4C:
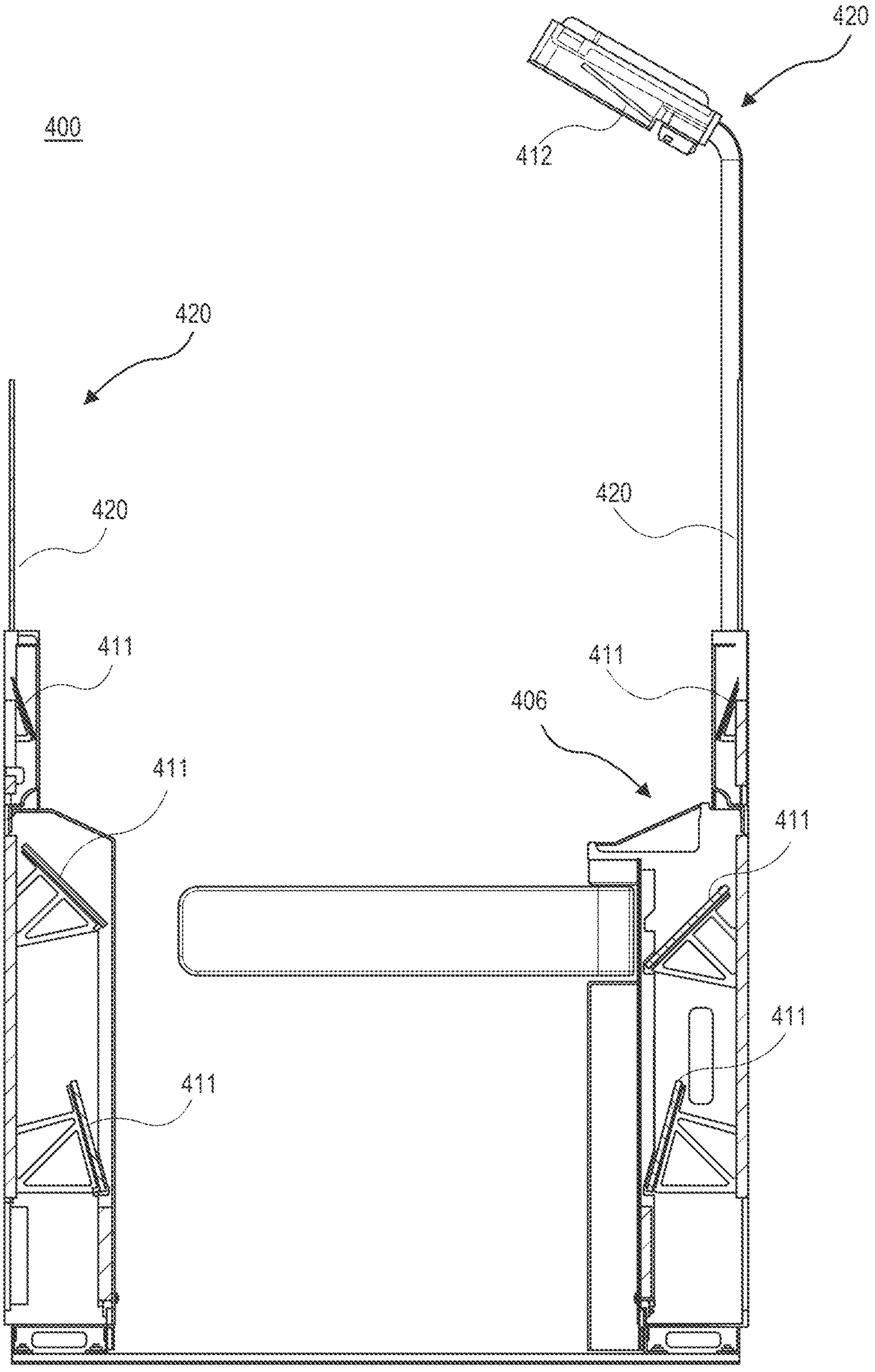
Figure 4D:
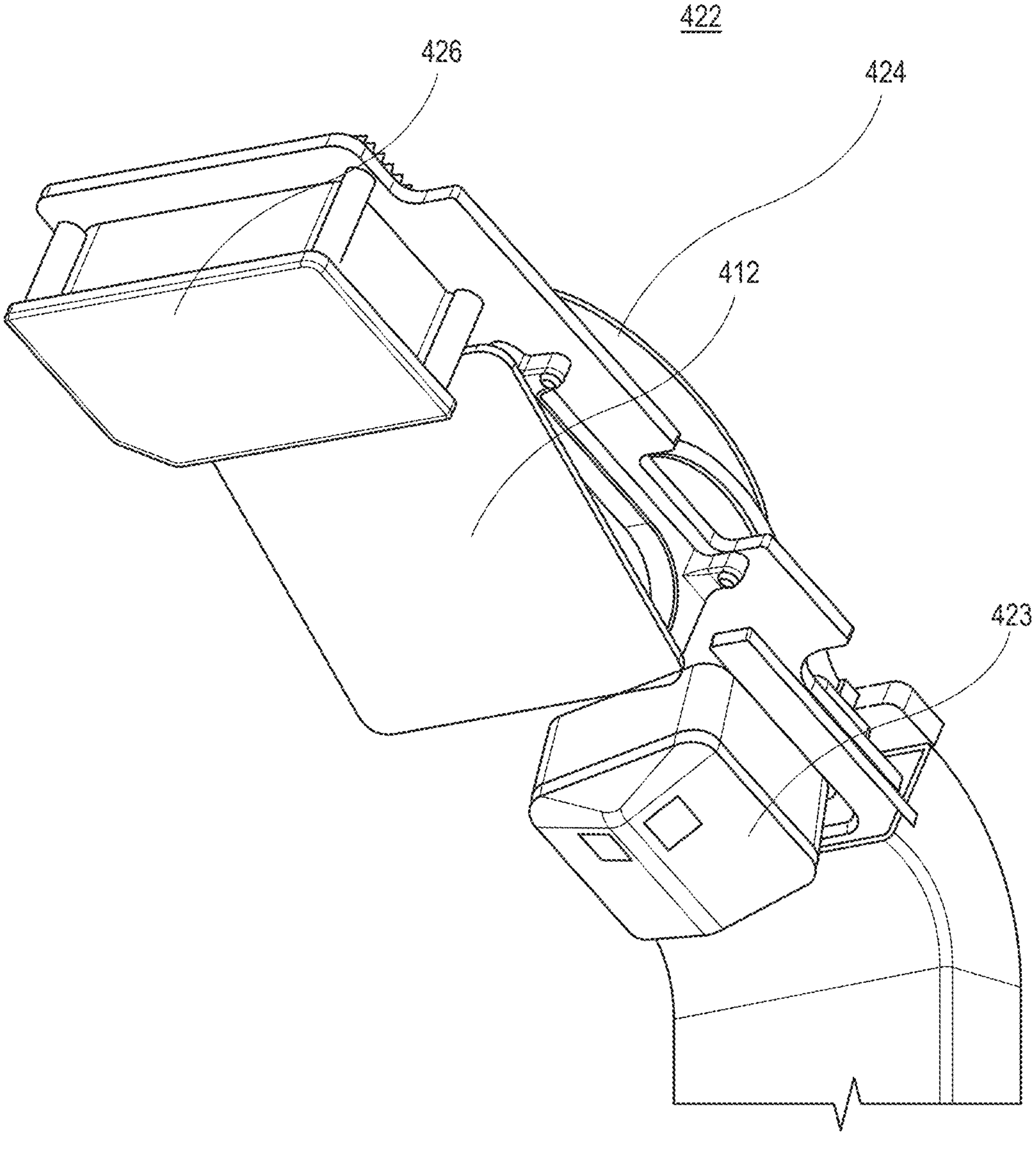
Figure 4E:
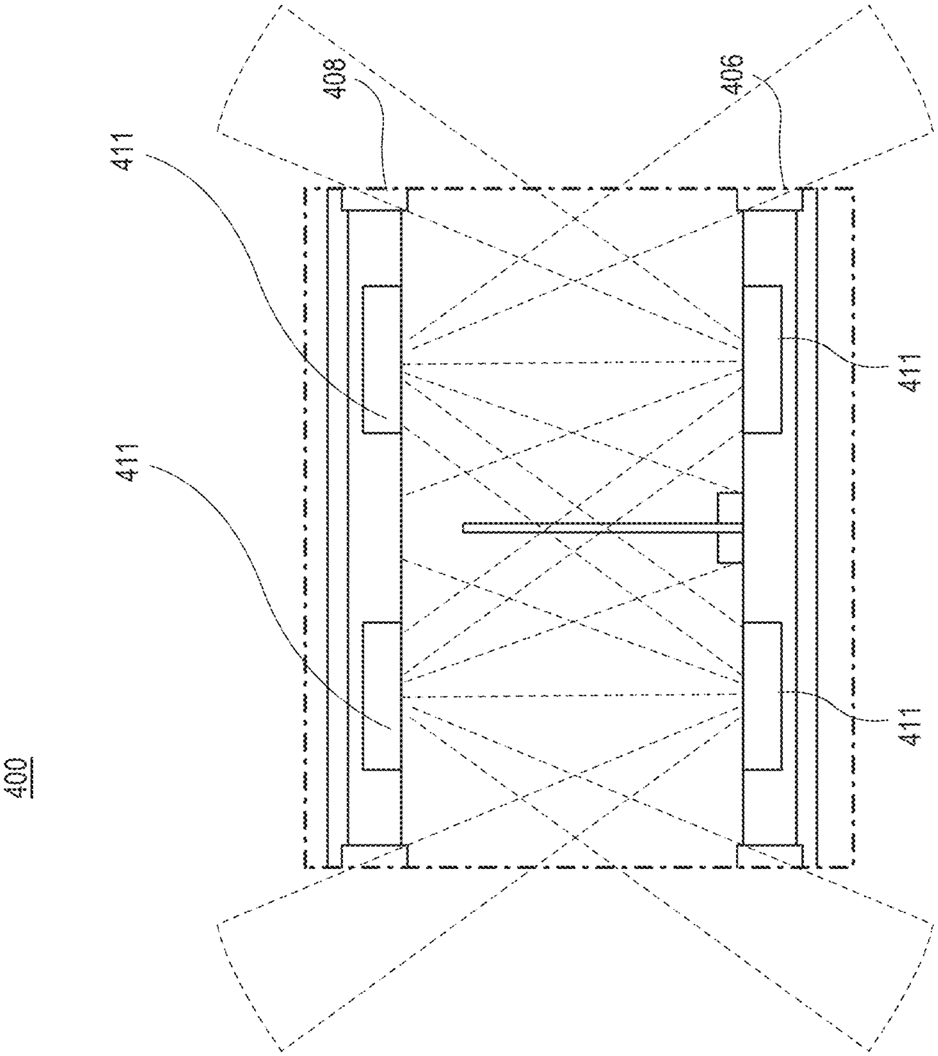
Figure 4F:
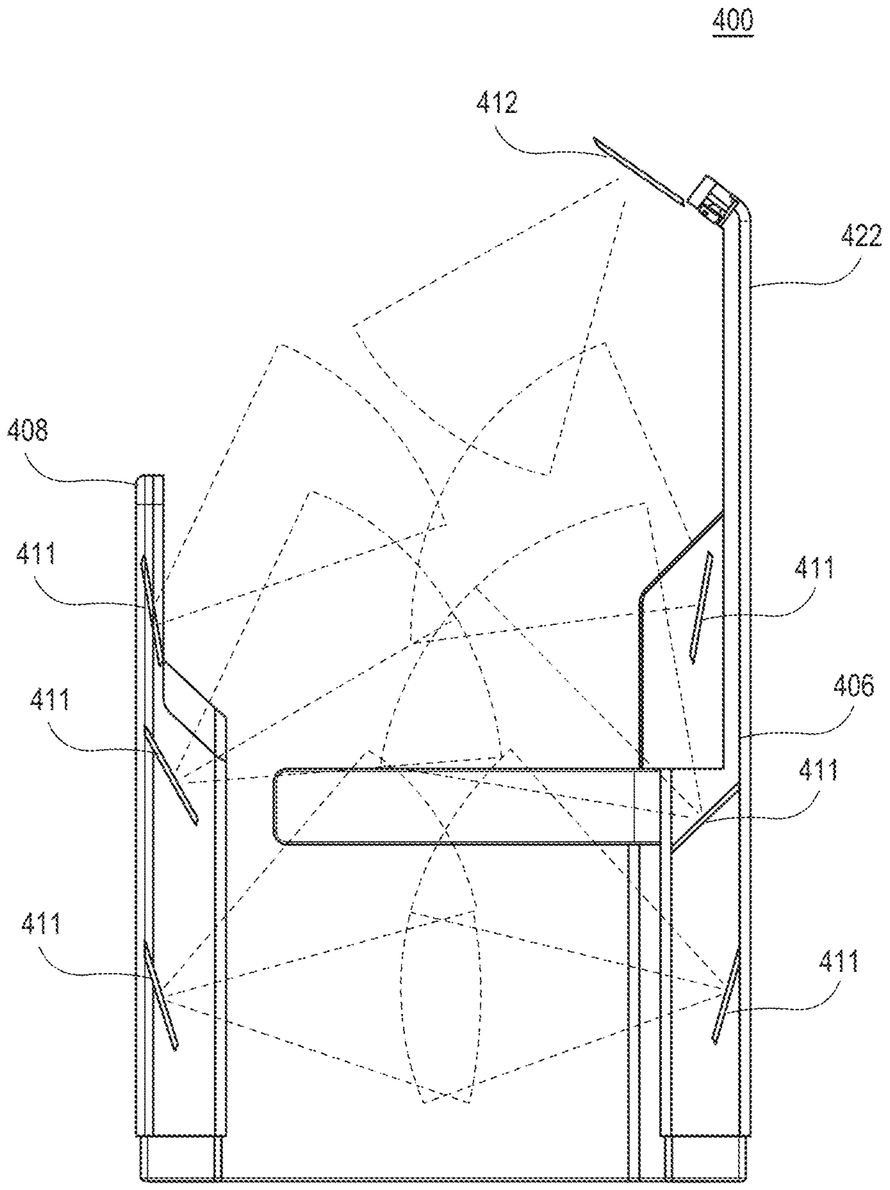
Figure 4G:
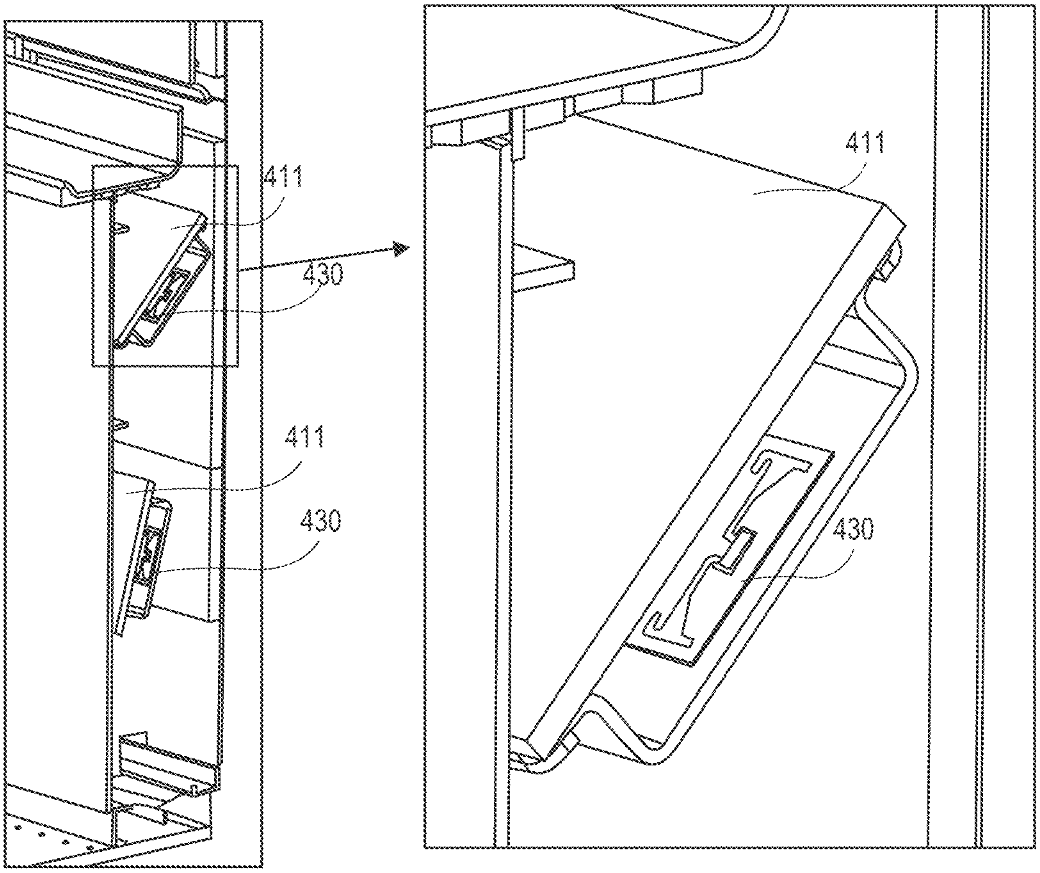
Figure 4H:
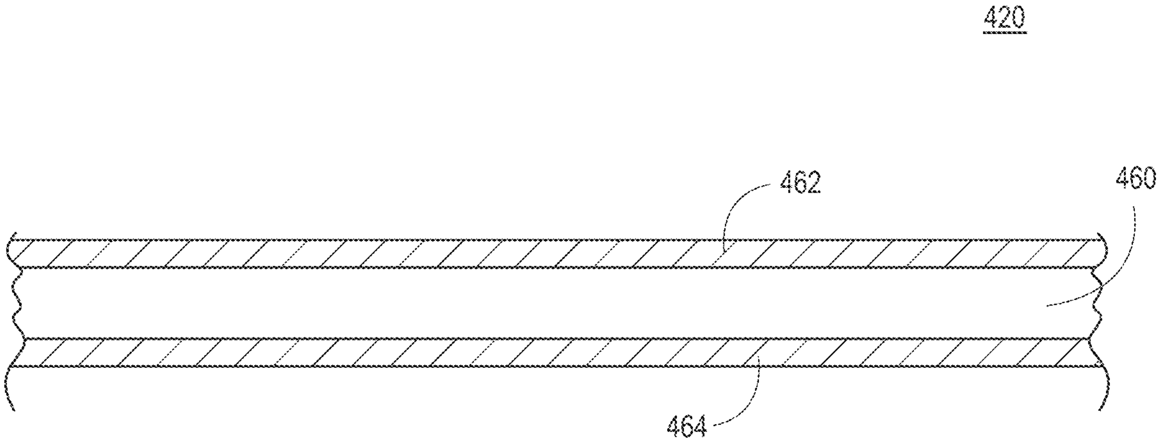

FIGS. 4A-4H are illustrations of exemplary features of an exemplary mobile RFID exit system 400, according to exemplary embodiments of the present disclosure. In exemplary implementations, mobile RFID exit system 400 may be substantially similar to mobile RFID exit system 110, mobile RFID exit system 200, and mobile RFID exit system 300 illustrated in FIGS. 1-3. FIG. 4A illustrates an exemplary first lane enclosure 406, FIG. 4B illustrates an exemplary second lane enclosure 408, FIG. 4C illustrate a side view of exemplary mobile RFID exit system 400, FIG. 4D illustrates an exemplary arm 422, FIGS. 4E and 4F illustrate exemplary emissions patterns and distributions for RF energy emitted by RFID reader antennas of mobile RFID exit system 400, FIG. 4G illustrates a close-up of an exemplary RFID validation tag 430, and FIG. 4H illustrates an exemplary RF shield 420.

As shown in FIGS. 4A and 4C, first lane enclosure 406 may include gate 402, gate hinge mechanism 403, one or more RFID reader antennas 411 (e.g., RFID reader antennas 411-1 through 411-6), optical scanner 416, visual indicator 418, speaker 419, RF shield 420, RFID validation tags 430 (e.g., RFID validation tags 430-1 through 430-6), RF absorbing foam 432, and enclosure case 440. As illustrated in FIGS. 4B and 4C, second lane enclosure 408 may include one or more RFID reader antennas 411 (e.g., RFID reader antennas 411-7 through 411-12), visual indicator 418, shield 420, RFID validation tags 430 (e.g., RFID validation tags 430-7 through 430-12), RF absorbing foam 432, plunger switch 433, and enclosure case 440. Additionally, arm 422 may include one or more RFID reader antennas 412, imaging sensor 423, networking access point 424, and ambient light 426, as shown in FIGS. 4C and 4D.

According to aspects of the present disclosure, RFID reader antennas 411, RF shield 420, RFID validation tags 430, RF absorbing foam 432, and enclosure case 440 may form at least a portion of an RFID subsystem of mobile RFID exit system 400. In exemplary implementations, the RFID subsystem may be configured to detect and read RFID tags affixed to items being carried through mobile RFID exit system 400, so that a cart of the items being carried through the lane of mobile RFID exit system 400 may be generated and processed. Further, the RFID subsystem may also include features to contain RF energy emitted by mobile RFID exit system 400 to within the lane of mobile RFID exit system 400 and block RF energy emitted by other sources from entering the lane of mobile RFID exit system 400 to prevent errant detection and reading of RFID tags by mobile RFID exit system 400 and/or other mobile RFID exit systems, which may be positioned adjacent to mobile RFID exit system 400. Additionally, the RFID subsystem may also be configured to perform verification and/or validation of the RFID subsystem (e.g., at setup, bring up, on a periodic basis, etc.) to ensure that the RFID subsystem is operating in accordance with defined specifications.

In exemplary implementations, as a user walks through mobile RFID exit system 400 with one or more items for purchase, RFID reader antennas 411 and 412 may detect and read RFID tags affixed to any items located in the lane of and/or being carried through the lane of mobile RFID exit system 400. For example, RFID reader antennas 411 and 412 may transmit a query or interrogator signal to detect and read the RFID tags affixed to items located in the lane of and/or being carried through the lane of mobile RFID exit system 400. In exemplary implementations, RFID reader antennas 411 and 412 may receive RF signals from RFID tags responding to the interrogator signal. The RF signals may include product information, such as electronic product codes (EPCs), that are encoded in the RFID tags. Additionally, the RF signals received by RFID reader antennas 411 and 412 from the RFID tags may be processed to determine other information and/or parameters associated with the received RF signals, such as received signal strength indicator (RSSI), and the like. The product information and the other information and/or parameters (e.g., RSSI), and a user's movement through mobile RFID exit system 400 (e.g., as detected and monitored by beam break sensors and imaging sensor 423) may be processed to generate a cart for the user moving through the lane of mobile RFID exit system 400. For example, the product information encoded in the received signals, the RSSI of the received signals, the movement of the user through the lane of mobile RFID exit system 400, the change in the RSSI of the received signals as a function of the user's movement through the lane of mobile RFID exit system 400 (as measured by one or more RFID reader antennas 411 and/or 412), a time at which the signals were received, and the like, may be processed (e.g., by a trained machine learning model, using a rule-based algorithm, etc.) to generate a cart. Preferably, the cart includes items associated with RFID tags that the system predicts are being carried through the lane of mobile RFID exit system 400 and excludes items associated with RFID tags that were detected and/or read that the system predicts are outside the lane of mobile RFID exit system 400 (e.g., RFID tags in different lanes of an adjacent mobile RFID exit system, RFID tags outside of mobile RFID exit system 400, etc.). The cart may then be processed using the authenticated payment method or instrument.

Additionally, gate hinge mechanism 403 may control operation of gate 402. For example, after a payment method has been authenticated for a user of mobile RFID exit system 400, gate hinge mechanism 403 may unlock gate 402 and/or automatically unlock gate 402 to allow the user to walk through mobile RFID exit system 400. In exemplary implementations, gate hinge mechanism 403 may include a solenoid, servo motor, or other actuator to control operation of gate 402. Additionally, gate hinge mechanism 403 may also include a hall sensor or other sensor to provide feedback information on the position of gate 402. The visual and audio indicators activated by mobile RFID exit system 400 may be based at least in part on the feedback information (e.g., instructing the user to move through mobile RFID exit system 400 if gate 402 is not opened for a certain period of time after the payment method has been authenticated, instructing the user to move through mobile RFID exit system 400 if gate 402 is held in an open position for a certain period of time, etc.).

As shown in FIGS. 4A-4F, RFID reader antennas 411 and 412 may be positioned to optimize coverage of the RF signals transmitted by RFID reader antennas 411 and 412 and target areas of the lane of mobile RFID exit system 400 where users may be carrying items. In exemplary implementations, the target areas correspond to regions in the lane of mobile RFID exit system 400 where it is likely and/or expected for user to be carrying items. FIGS. 4E and 4F illustrate exemplary emissions patterns and distributions for RF energy emitted by RFID reader antennas 411 and 412. For example, RFID reader antennas 411 may be angled upwards to direct the transmitted RF signals to create a detection area from the floor to a predetermined height from the floor (e.g., 4 feet, 5 feet, 6 feet, 7 feet, etc.) in the lane of mobile RFID exit system 400 and target an upper portion of users of mobile RFID exit system 400. Additionally RFID reader antenna 412 disposed in arm 422 may provide additional coverage for RFID tags that may be detected at an elevated height in the lane of mobile RFID exit system 400. The arrangement of RFID reader antennas 411 on either side of the lane of mobile RFID exit system 400 can facilitate a symmetric field distribution and minimize the blocking of the RF signals transmitted by RFID reader antennas 411 by the user.

Alternatively and/or in addition, the positioning and/or orientation of RFID reader antennas 411 and 412 may be adjustable so that different areas and/or portions of the lane of mobile RFID exit system 400 may be targeted. In exemplary implementations, RFID reader antennas 411 and 412 may be coupled to an articulating member that may adjust an angle of RFID reader antennas 411 and 412. Accordingly, RFID reader antennas 411 and 412 may be dynamically adjusted based on the position and/or movement of a user (e.g., based on detection and monitoring using beam break sensors, imaging sensors, etc.), may be configured to oscillate so that RFID reader antennas 411 and 412 continuously sweep through various angular orientations, and the like.

In addition to arranging and positioning RFID reader antennas 411 and 412 to maximize the detection area within the lane of mobile RFID exit system 400, RFID reader antennas 411 and 412, RF shield 420, RFID validation tags 430, RF absorbing foam 432, and enclosure case 440 may be configured, positioned, and arranged to confine RF energy transmitted by RFID reader antennas 411 and 412 to within the lane of mobile RFID exit system 400 and limit the amount of stray RF energy outside the lane of mobile RFID exit system 400, so as to avoid errantly detecting and reading RFID tags that are located outside mobile RFID exit system 400. For example, RFID reader antennas 411 may include high gain, circular polarized, patch antennas having multiple-element fixed-beam patch arrays that provide a narrow beam width for confining the RF energy within the lane of mobile RFID exit system 400.

In addition to the design, positioning, and arrangement of RFID reader antennas 411 and 412, as shown in FIGS. 4A-4C, RF shields 420, RF absorbing foam 432, and enclosure case 440 may further prevent RF energy from escaping mobile RFID exit system 400. For example, enclosure case 440 may be formed of a metal material that blocks and/or reflects RF energy and may work in conjunction with RF absorbing foam 432 to block, reflect, and absorb the RF energy emitted by RFID reader antennas 411 and 412 to minimize the RF energy that escapes from mobile RFID exit system 400. Additionally, RF shields 420 may further block the RF energy emitted by RFID reader antennas 411 and 412 from escaping mobile RFID exit system 400. In exemplary implementations, first lane enclosure 406 and second lane enclosure 408 may include RF shields 420, which may be coupled to and may extend above first lane enclosure 406 and second lane enclosure 408 to further block the RF energy emitted by RFID reader antennas 411 and 412 from escaping mobile RFID exit system 400. Preferably, RF shields 420 are made from transparent materials to prevent a closed-in and/or claustrophobic feeling from within mobile RFID exit system 400, thereby improving the user experience of mobile RFID exit system 400. In an exemplary implementation, as shown in FIG. 4H, RF shields 420 may include a transparent RF shielding film 462 attached to transparent panel 460. Transparent RF shielding film 462 may include any metalized film (e.g., wire mesh, nanowire mesh, etc.) configured to block RF energy while maintaining optical transparence. Optionally, a second transparent RF shielding film 464 may be attached to the other side of transparent panel 460.

Additionally, as shown in FIGS. 4A, 4B, and 4G, mobile RFID exit system 400 may include one or more RFID validation tags 430. RFID validation tags 430 may be positioned and arranged at particular locations within mobile RFID exit system 400. For example, RFID validation tags 430 may be distributed throughout mobile RFID exit system 400 with sufficient spacing relative to each other and/or at particular locations relative to RFID reader antennas 411 so that each RFID validation tag 430 can be differentiated based on the response from each tag. Further, RFID validation tags 430 are positioned based on the emission patterns of RFID reader antennas 411, as well as an effort to minimize interference, while maintaining accuracy and consistency. Accordingly, RFID validation tags 430 are preferably not positioned between RFID reader antennas 411 and the lane of mobile RFID exit system 400 or within a certain distance from a front surface of RFID reader antennas 411 so as to prevent potential interference. Additionally, certain antennas (e.g., SP12 antennas, etc.) may be designed and/or have a radiation pattern such that positioning one or more RFID validation tags 430 behind a respective RFID reader antenna 411 results in good selectivity and consistency. However, other antennas (e.g., P12 antennas, etc.) may include a continuous ground plane on the backside of the RFID reader antennas, thereby requiring that RFID validation tags 430 be mounted in the opposite lane enclosure across the lane (e.g., RFID validation tags 430-1 and 430-2 included in first lane enclosure 406 correspond to RFID reader antennas 411-8 and 411-7, respectively, in second lane enclosure 406 and RFID validation tags 430-7 and 430-8 included in second lane enclosure 408 correspond to RFID reader antennas 411-2 and 411-1, respectively, in first lane enclosure 406). Based on the positioning of RFID validation tags 430, a mapping of the position of each RFID validation tags 430 relative to one another and/or relative to one or more RFID reader antennas 411 may be determined and maintained. For example, RFID validation tag 430-1 may be positioned and arranged at a particular location relative to a respective RFID reader antenna 411-8, RFID validation tag 430-2 may be positioned and arranged at a particular location relative to a respective RFID reader antenna 411-7, RFID validation tag 430-3 may be positioned and arranged at a particular location relative to a respective RFID reader antenna 411-3, RFID validation tag 430-4 may be positioned and arranged at a particular location relative to a respective RFID reader antenna 411-4, RFID validation tag 430-5 may be positioned and arranged at a particular location relative to a respective RFID reader antenna 411-5, RFID validation tag 430-6 may be positioned and arranged at a particular location relative to a respective RFID reader antenna 411-6. Similarly, RFID validation tag 430-7 may be positioned and arranged at a particular location relative to a respective RFID reader antenna 411-2, RFID validation tag 430-8 may be positioned and arranged at a particular location relative to a respective RFID reader antenna 411-1, RFID validation tag 430-9 may be positioned and arranged at a particular location relative to a respective RFID reader antenna 411-9, RFID validation tag 430-10 may be positioned and arranged at a particular location relative to a respective RFID reader antenna 411-10, RFID validation tag 430-11 may be positioned and arranged at a particular location relative to a respective RFID reader antenna 411-11, RFID validation tag 430-12 may be positioned and arranged at a particular location relative to a respective RFID reader antenna 411-12.

Additionally, RFID validation tags 430 preferably include RFID tags that include a protected mode. In protected mode, RFID validation tags 430 are configured to only respond to RFID readers when a password is included in a query transmitted by the RFID reader. Thus, in protected mode, RFID validation tags 430 are essentially invisible to RFID readers that do not include the correct password for querying RFID validation tags 430. Accordingly, the protected mode allows RFID validation tags 430 to not affect the performance of mobile RFID exit system 400 during normal operation and also facilitates verification and/or validation of the RF subsystem of mobile RFID exit system 400 without introducing additional hardware or complexity when compared with other approaches, such as filters, mechanical shielding and/or blocking, programmatically controlled tags, and the like. Accordingly, protected mode may be selectively activated prior to performing verification and/or validation of the RFID subsystem using RFID validation tags 430. Alternatively, protected mode may be always enabled and may only be read when queried with a proper command that includes the correct password.

In exemplary implementations, to perform verification and/or validation of mobile RFID exit system 400, RFID validation tags 430 and the RFID readers of mobile RFID exit system 400 are placed in protected mode. Accordingly, RFID validation tags 430 are configured so that they will only respond to queries having the correct password and the RFID readers will be programmed to include the correct password in its queries. After RFID validation tags 430 and the RFID readers have been placed in protected mode, RFID reader antennas 411 may be powered for a period of time to perform a frequency sweep over numerous channels. Accordingly, RFID validation tags 430 are detected and read while RFID reader antennas 411 are powered and various information and parameters, such as read counts and signal strength values (e.g., RSSI, etc.), may be collected in connection with the detection and reading of RFID validation tags 430. The various information and parameters may be processed to determine faults and facilitate troubleshooting of the RFID subsystem. For example, for a particular antenna of RFID reader antennas 411 under test, the signal strength values in connection with each RFID validation tag 430 (and the mapping of the position of each RFID validation tag 430) may be processed to determine whether the antenna under test in operating properly.

In an exemplary implementation where RFID reader antenna 430-9 is being tested, an RSSI value may be measured for each read of each RFID validation tag 430. Optionally, for each RFID validation tag, the RSSI values measured in connection with each RFID validation tag 430 may be combined into an average RSSI value for each RFID validation tag 430. Accordingly, in connection with the testing of RFID reader antenna 430-9, an RSSI value may be determined for each RFID validation tag 430. The RSSI values for RFID validation tags 430 may then be processed to determine whether RFID reader antenna 430-9 is operating in accordance with defined specifications. For example, for each RFID validation tag, it may be determined whether the corresponding RSSI value is within a predetermined range. Assuming that the RSSI value falls within the predetermined range, it can be assumed that RFID reader antenna 430-9 is operating in accordance with the defined specifications. Additionally, the RSSI values for RFID validation tags 430 can be compared against each other to determine relative RSSI values for RFID validation tags 430. Accordingly, in testing RFID reader antenna 411-9, it may be expected that the RSSI value associated with RFID validation tag 430-9 would be highest (e.g., since it is closest to RFID reader antenna 411-9) relative to the RSSI values associated with the other RFID validation tags. Further, the RSSI values for each RFID validation tag may be compared against an order of expected relative strengths for RSSI values. If the RSSI values do not follow the order of expected relative strengths for RSSI values, it may be representative of incorrect cabling or other defect. For example, if the RSSI value associated with RFID validation tag 430-9 was expected to be highest and the RSSI value associated with RFID validation tag 430-12 was expected to be lowest, then it may be assumed that the cabling for RFID validation tag 430-9 and 430-12 was switched.

Figure 5:
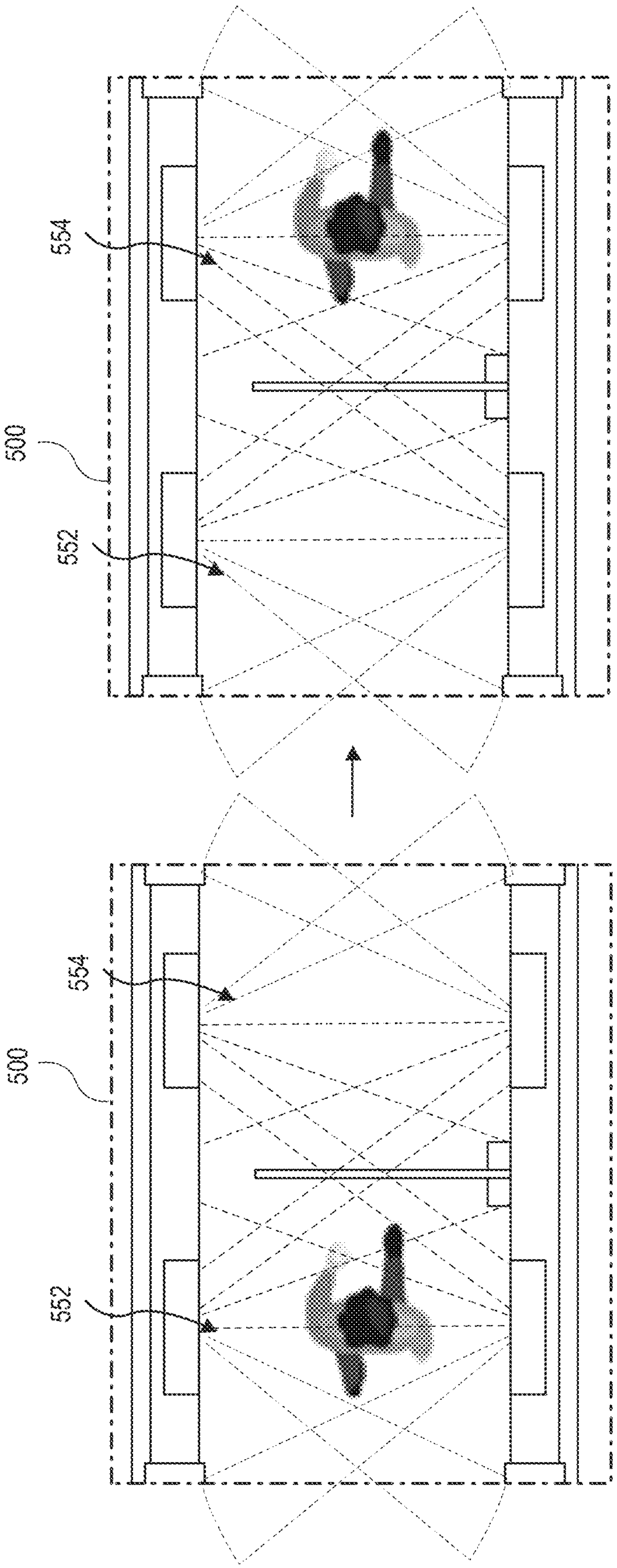
FIG. 5 is an illustration of a user utilizing exemplary mobile RFID exit system, according to exemplary embodiments of the present disclosure.

FIG. 5 is an illustration of a user utilizing exemplary mobile RFID exit system 500, according to exemplary embodiments of the present disclosure. In exemplary implementations, mobile RFID exit system 400 may be substantially similar to mobile RFID exit system 110, mobile RFID exit system 200, mobile RFID exit system 300, and mobile RFID exit system 400 illustrated in FIGS. 1-4. Further, multiple mobile RFID exit systems 500 may be installed (e.g., side by side, etc.) at a facility to form multiple checkout exit lanes for the facility.

As shown in FIG. 5, a user may enter mobile RFID exit system 500. In exemplary implementations, prior to the user entering mobile RFID exit system 500, visual indicators and/or speakers may indicate and/or communicate to the user that mobile RFID exit system 500 is available for use. After it is determined that the user has entered mobile RFID exit system 500 (e.g., using beam break sensors, imaging sensors, interaction with a payment terminal, etc.), the visual indicators and/or speakers may indicate and/or instruct the user to authenticate a payment method using a payment terminal or by scanning a QR code or other identifier associated with a membership account that may be tied with a payment method. While the user is authenticating a payment method, RFID readers may be detecting and reading RFID tags affixed to one or more items being carried by the user. In the event that authentication of the payment method was unsuccessful, the visual indicators and/or speakers may communicate and/or indicate to the user that authentication was unsuccessful and to try again or to try a different payment method.

Once a payment method is authenticated, a gate may be unlocked and/or opened, and the visual indicators and/or speakers may communicate and/or indicate to the user to continue walking through mobile RFID exit system 500. Accordingly, the user may proceed through the gate, and the user's movement may be monitored using additional beam break sensors and/or imaging sensors. As the user proceeds to advance through mobile RFID exit system 500, RFID readers may continue to detect and read RFID tags affixed to one or more items located in the lane of and/or being carried through the lane of mobile RFID exit system 500, and mobile RFID exit system 500 may generate a cart that includes the items associated with the read RFID tags and process the cart using the authenticated payment method. In generating the cart, the RFID readers may read EPCs and/or other product information, as well as parameters associated with the RF signal received from the RFID tags, such as signal strength, changes in the signal strength, and the like. The RF signal parameters may be used to distinguish between RFID tags that mobile RFID exit system 500 predicts are being carried through mobile RFID exit system 500 and RFID tags that mobile RFID exit system 500 predicts are not within the lane of mobile RFID exit system 500 (e.g., in an adjacent mobile RFID exit system, outside mobile RFID exit system 500, etc.) to prevent errant reading of RFID tags that are not associated with items being carried by the user. Accordingly, the product information and the RF signal parameters, as well as the user's movements, may be used in generating the cart for the user. As the user continues to advance through mobile RFID exit system 500 and exit the facility, mobile RFID exit system 500 may detect, using beam break sensors and/or imaging sensors, that the user has exited mobile RFID exit system 500. In response to the determination that the user has exited mobile RFID exit system 500, the visual indicators and/or speakers may indicate and/or communicate to users that mobile RFID exit system 500 is again available for use.

Figure 6:
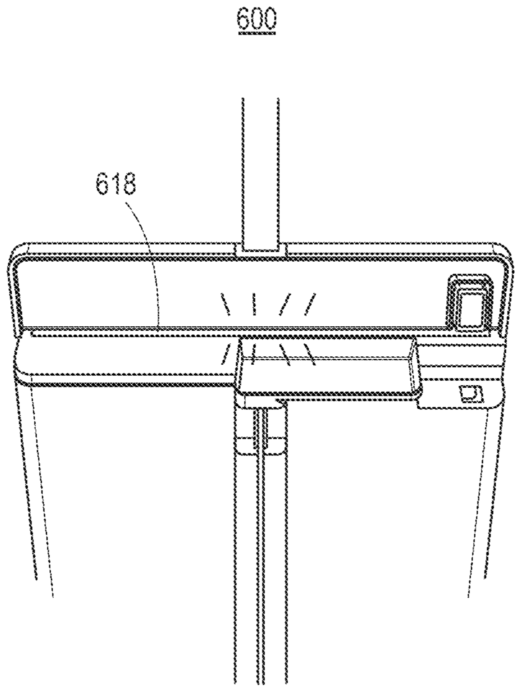
FIG. 6 is an illustration of an exemplary visual indicator of an exemplary mobile RFID exit system, according to exemplary embodiments of the present disclosure.

FIG. 6 is an illustration of an exemplary visual indicator 618 of an exemplary mobile RFID exit system 600, according to exemplary embodiments of the present disclosure.

As shown in FIG. 6, visual indicator 618 may indicate and/or communicate a status of mobile RFID exit system 600 and/or assist and direct users of mobile RFID exit system 600 with visual cues. According to exemplary embodiments of the present disclosure, visual indicator 618 can include one or more light bars (e.g., LED light bars, etc.) that extend the length of a lane enclosure of mobile RFID exit system 600. Visual indicator 618 may be configured to change colors and provide animations as visual indicators to users of mobile RFID exit system 600.

In exemplary implementations, visual indicator 618 can indicate a status of mobile RFID exit system 600. For example, when mobile RFID exit system 600 is available for use, the entire length of the light bars comprising visual indicator 618 may be illuminated using a first color, such as white. Optionally, visual indicator 618 may be illuminated with an animation (e.g., a breathing pattern, a pulsing pattern, etc.). Alternatively and/or in addition, if mobile RFID exit system 600 is not available for use (e.g., a fault is detected or otherwise inoperable), the entire length of the light bars comprising visual indicator 618 may be illuminated using a second color, such as red. Optionally, visual indicator 618 may be illuminated with an animation (e.g., a breathing pattern, a pulsing pattern, etc.).

In addition to communicating a status of mobile RFID exit system 600, visual indicator 618 may also be configured to assist users of mobile RFID exit system 600. For example, the illumination pattern of visual indicator 618 may change once a user enters mobile RFID exit system 600 to indicate to the user that mobile RFID exit system 600 has detected the user (e.g., using beam break sensors and/or imaging sensors/devices, etc.) and is ready to process a transaction in connection with the user.

Additionally, visual indicator 618 may illuminate different illumination patterns (e.g., solid, pulsing, flashing, etc.) and/or different colors (e.g., white, red, blue, green, etc.) to communicate various states to the user. In exemplary implementations, the different illumination patterns and/or colors can represent that the user is to authenticate a payment method, that authentication of the payment method was successful or unsuccessful, that a loyalty, rewards, or other membership account was identified, that the gate is unlocked and the user can proceed to exit mobile RFID exit system 600, and the like. For example, visual indicator 618 may indicate or communicate to a user that authentication of a payment method is required by illuminating a portion of visual indicator 618 that proximate a payment terminal. Optionally, the illumination may be accompanied by an animation or illumination pattern (e.g., flashing, pulsing, etc.).

While awaiting authentication of a payment method, the color, animation, and/or illumination pattern of visual indicator 618 may again change. For example, a color of the illumination may change (e.g., to yellow, etc.), the illumination pattern may be a pulsing pattern, etc. If authentication of a payment method was successful, the color, animation, and/or illumination pattern of visual indicator 618 may change. For example, the illuminated portion proximate the payment terminal may change from a white color to a blue color, the illuminated pattern proximate the payment terminal may change from a flashing pattern to a solid on illumination, and the like. Alternatively and/or in addition, if authentication of a payment method was unsuccessful, the color, animation, and/or illumination pattern of visual indicator 618 may change to indicate the unsuccessful authentication. For example, the illuminated portion proximate the payment terminal may change from a white color to a red color, the illuminated pattern proximate the payment terminal may change from a solid on pattern to a flashing pattern, and the like.

Additionally, in the event of successful authentication of a payment method, the color, animation, and/or illumination pattern of visual indicator 618 may change to indicate to the user to proceed through the gate to exit mobile RFID exit system 600. For example, a color of the illumination of visual indicator 618 may change to a green color, the illuminated pattern may change to sequential, rolling illumination of visual indicator 618 (e.g., similar to runway lights) urging the user to exit mobile RFID exit system 600, and the like.

Figure 7A:
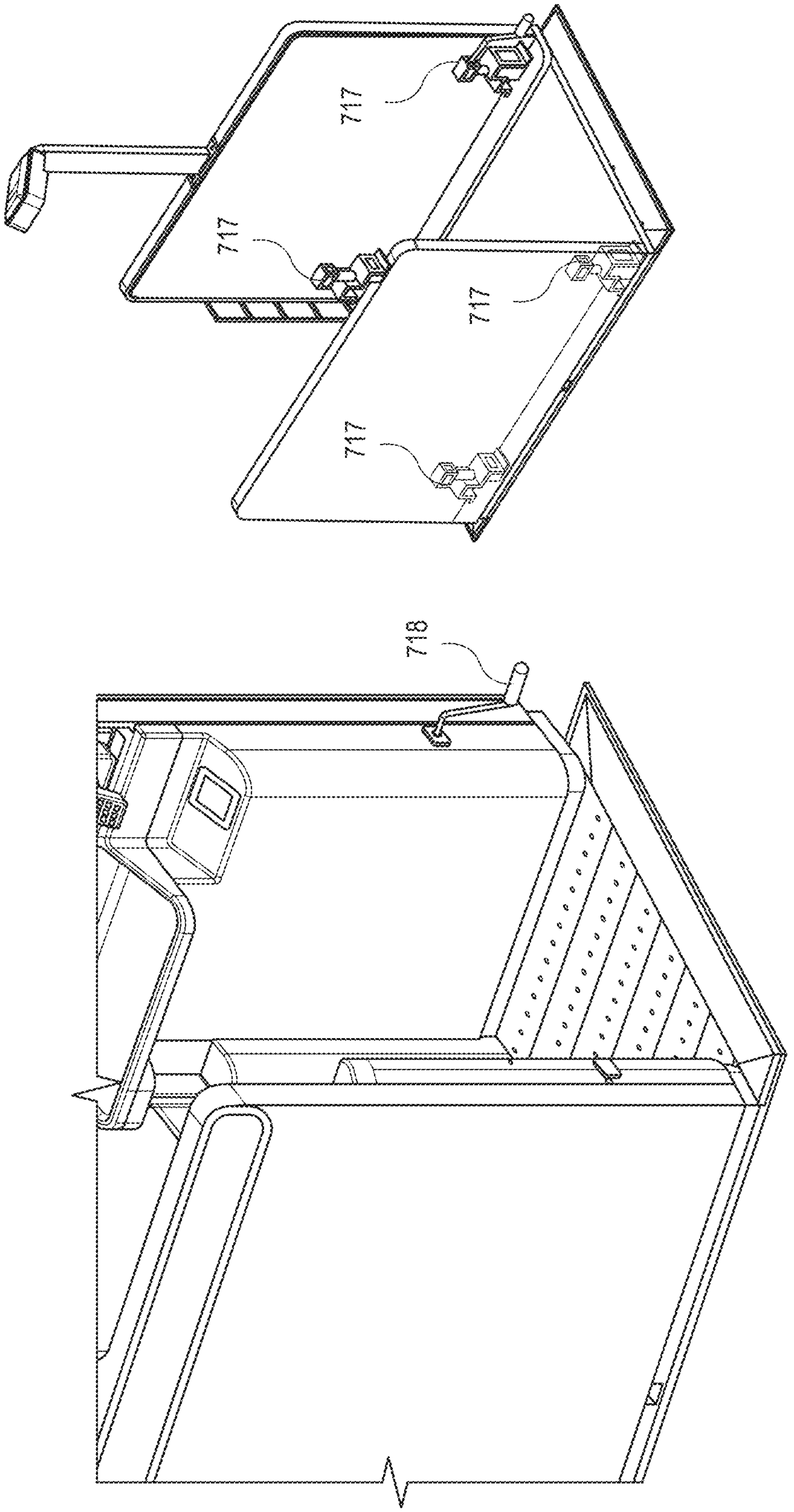
FIGS. 7A and 7B illustrate exemplary mobility features of mobile RFID exit system, according to exemplary embodiments of the present disclosure.
Figure 7B:
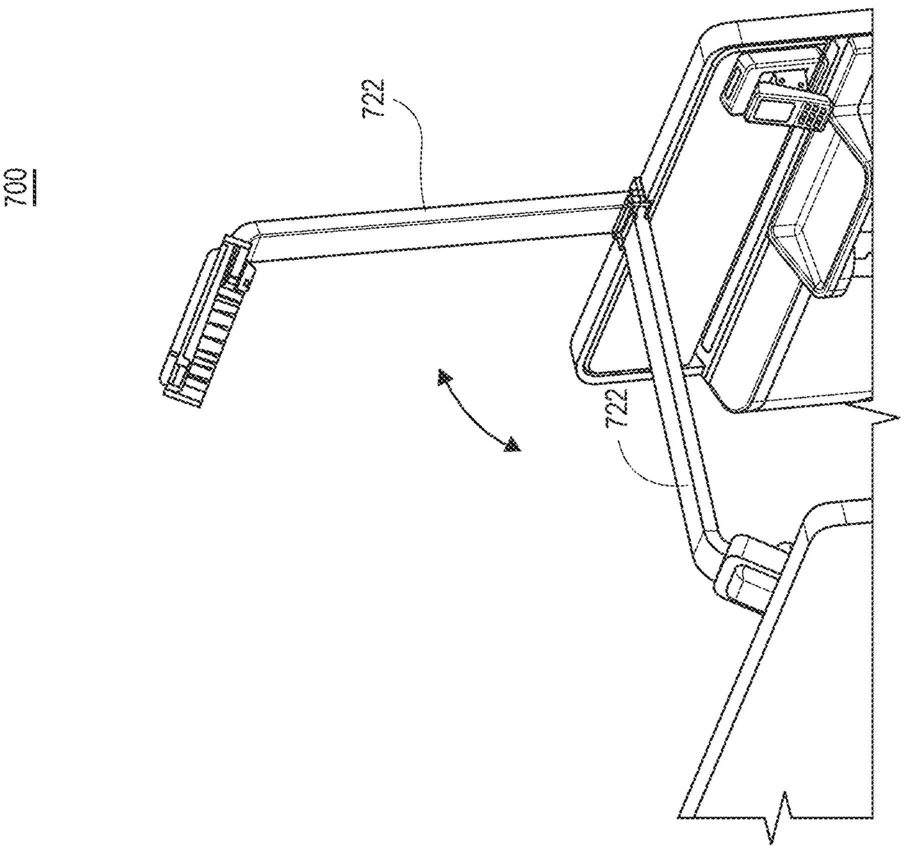

FIGS. 7A and 7B illustrate exemplary mobility features of mobile RFID exit system 700, according to exemplary embodiments of the present disclosure.

As shown in FIG. 7A, mobile RFID exit system 700 may include various features to facilitate transport, positioning, and installation of mobile RFID exit system 700. As illustrated in FIG. 7A, mobile RFID exit system 700 may include one or more mobility devices 717 that may be selectively deployed for moving and/or positioning mobile RFID exit system 700. Preferably, mobility devices 717 may be positioned and arranged at each corner of mobile RFID exit system 700. Alternatively and/or in addition, mobile RFID exit system 700 may also include additional mobility devices 717.

In an exemplary implementation, mobility devices 717 may include caster wheels that may be deployed/extended and/or retracted via a jack mechanism 718. Accordingly, mobility devices 717 may be deployed from a retracted position to an extended position via jack mechanism 718 in preparation to move and/or position mobile RFID exit system 700. Mobile RFID exit system 700 may then be moved or positioned using mobility devices 717, and once mobile RFID exit system 700 is in the desired location or position, mobility devices 717 may be retracted using jack mechanism 718.

In addition to mobility devices 717, as shown in FIG. 7B, arm 722 may be configured to articulate between a lowered position and a raised position. For example, the lowered position may be preferable for shipping and transporting mobile RFID exit system 700 and the raised position may correspond to the default position for regular operation of mobile RFID exit system 700 when mobile RFID exit system 700 has been installed and/or deployed. In exemplary implementations, arm 722 may articulate between the lowered position and the raised position via a dampened hinge. Further, arm 722 may further include fasteners (e.g., bolts, screws, etc.) to secure arm 722 in the lowered position and in the raised position.

Figure 8:
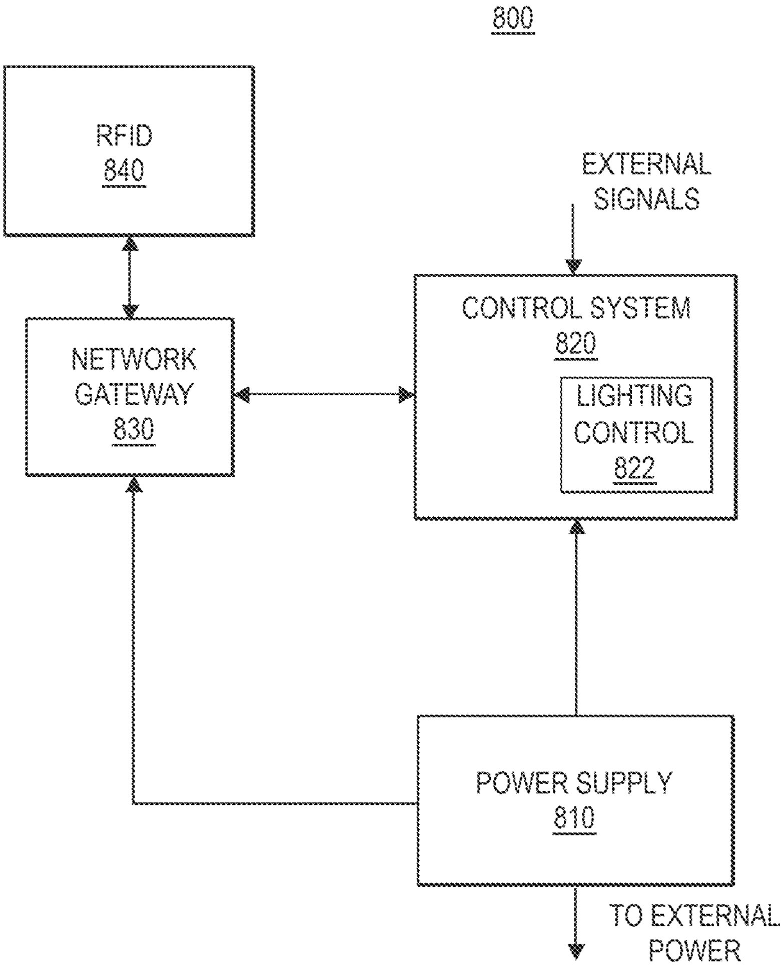
FIG. 8 is a block diagram of an exemplary architecture of an exemplary mobile RFID exit system, according to exemplary embodiments of the present disclosure.

FIG. 8 is a block diagram of an exemplary architecture 800 of an exemplary mobile RFID exit system, according to exemplary embodiments of the present disclosure.

As shown in FIG. 8, architecture 800 of an exemplary mobile RFID exit system, such as exemplary mobile RFID exit system 100, may include power supply 810, control system 820, network gateway 830, RFID subsystem 840, and lighting control 822. In exemplary implementations, power supply 810 may be configured to have a single AC power cable that may simply be plugged into a standard 120V or 240V outlet. Accordingly, this can facilitate efficient setup of the exemplary mobile RFID exit system without having to hire an electrician or other contractors.

Additionally, power supply may also include an uninterruptable power supply employing a supercapacitor. The supercapacitor may be configured to provide continuous power to the exemplary mobile RFID exit system in brown out conditions and/or in situations where the exemplary mobile RFID exit system experiences a temporary loss of power (e.g., up to 1 minute, up to 2 minutes, etc.). Power supply 810 may further include a power distribution module configured to distribute power to control system 820, network gateway 830, and/or lighting control 822.

As illustrated, network gateway 830 may include a power over ethernet (PoE) gateway configured to provide data connections between control system 820, RFID subsystem 840, a network access point, and/or networked and remote computing resources. Additionally, network gateway 830 may be configured to power RFID subsystem 840 via a PoE connection. Control system 820 may include a processor and a memory and be configured to communicate with an authentication subsystem (e.g., payment terminal, optical scanner/reader, etc.), one or more tamper switches, operation of a gate (e.g., via a solenoid, servo motors, etc.), a speaker, lighting control 822, and the like. Lighting control 822 may include an LED driver in communication with control system 820 to control operation of visual indicators. According to certain aspects of the present disclosure, control system may receive external signals (e.g., fire alarm signal, etc.) to perform certain actions based on the external signal. For example, a gate may be unlocked upon receipt of an emergency signal such as a fire signal to facilitate evacuation of the facility.

Additionally, RFID subsystem 850 may include one or more RFID reader antennas, RFID readers, and the like, to detect and read RFID tags present in the exemplary mobile RFID exit system. Additionally, RFID subsystem 850 may include one or more beam break sensors and/or imaging sensor to detect and monitor the movement of user through exemplary mobile RFID exit system.

Figure 9:
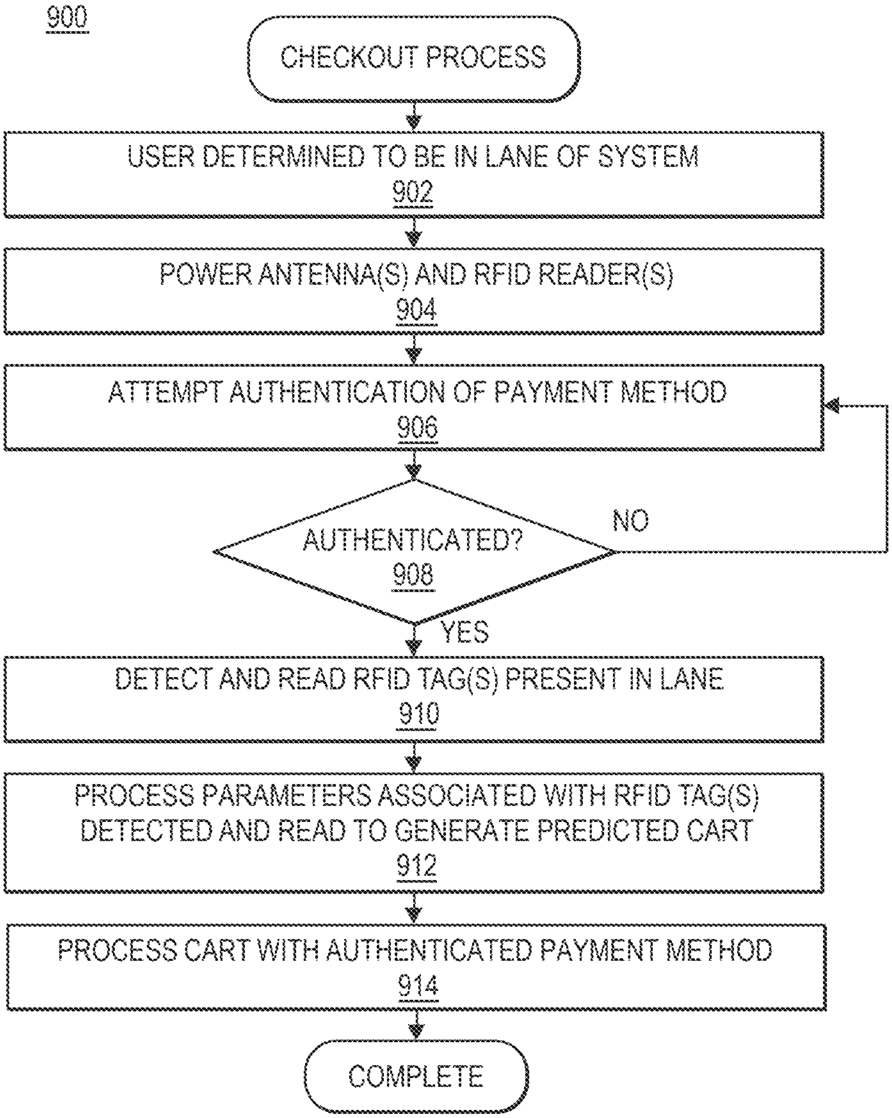
FIG. 9 is a flow diagram of an exemplary checkout process, according to exemplary embodiments of the present disclosure.

FIG. 9 is a flow diagram of an exemplary checkout process 900, according to exemplary embodiments of the present disclosure.

As shown in FIG. 9, process 900 may begin with detection of a user of a mobile RFID exit system, as in step 902. For example, it may be determined that a user is in the lane of the mobile RFID exit system. For example, the determination that a user has entered the lane may be based on whether user is detected by one or more beam break sensors and/or imaging sensors, that the user interacted with a payment terminal of the mobile RFID exit system, and the like. In response to the detection of the user, the RFID reader antennas and/or RFID readers of mobile RFID exit system may be powered, as in step 904. Alternatively and/or in addition, the RFID reader antennas and/or RFID readers of mobile RFID exit system may always remain in a powered state.

In step 906, authentication of a payment method may be attempted. This can include, for example, reading a payment instrument and/or method associated with the user using one or more sensors and/or readers (e.g., near field communications "NFC", image sensors, optical sensor, etc.) that and requesting authorization of the payment instrument and/or method from a third party payment processor. For example, the one or more sensors and/or readers may include a NFC reader, magnetic reader, card chip reader, and the like, and be configured to read a payment instrument such as a debit card, credit cart, mobile wallet, electronic payment service (e.g., Venmo, PayPal, etc.) via, and request authorization from a third-party payment processor. Optionally, an optical reader configured to read a QR code, barcode, and the like, may identify a loyalty, rewards, or other membership associated with the user and the facility and a payment instrument associated with any such loyalty, rewards, or other membership, so that any such identified payment instrument may be authenticated. In step 908, it may be determined whether the payment method was authenticated. If not, process 900 may return to step 906.

After a payment method is authenticated, in step 910, RFID tags present in the lane of the mobile RFID exit system may be detected and read. For example, RFID tags affixed to items located in the lane of and/or being carried through the lane of mobile RFID exit system may be detected and read as the user is proceeding through the lane of mobile RFID exit system. As the user proceeds to advance through the lane of mobile RFID exit system, RFID readers may continue to detect and read and collect parameters associated with the reading of the RFID tags affixed to one or more items being carried by the user. For example, the RFID readers may read product information, such as EPC codes, pricing information, and the like, encoded on the RFID tags, signal strength information (e.g., RSSI, etc.) associated with the reading of the RFID tags, and the like.

In step 912, the parameters and information obtained in connection with the reading of the RFID tags may be processed to generate a predicted cart of items. For example, the parameters, such as signal strength information, changes in signal strength information as the user proceeds through the lane of the mobile RFID exit system, and the like, may be processed to determine which RFID tags are in the lane of the mobile RFID exit system and which RFID tags are outside the lane of the mobile RFID exit system. RFID tags that are outside of the lane of the mobile RFID exit system (e.g., in an adjacent lane, somewhere else in the facility, etc.) but are detected and read may be considered to be errant detections and reads of RFID tags that should not be processed in connection with the user in the lane of the mobile RFID exit system. Accordingly, a cart that includes items associated with the RFID tags determined to be within the lane of the mobile RFID exit system may be generated. For example, the product information encoded on the RFID tags may include a price, product description, etc. Alternatively and/or in addition, the product information may be used to query a database to obtain other product information such as pricing, product description, and the like.

After the cart has been generated, in step 914, the cart may be processed using the payment method that was authenticated in connection with the user. For example, the items in the cart (along with any appropriate taxes, fees, etc.) may be charged to the authenticated payment method.

Figure 10:
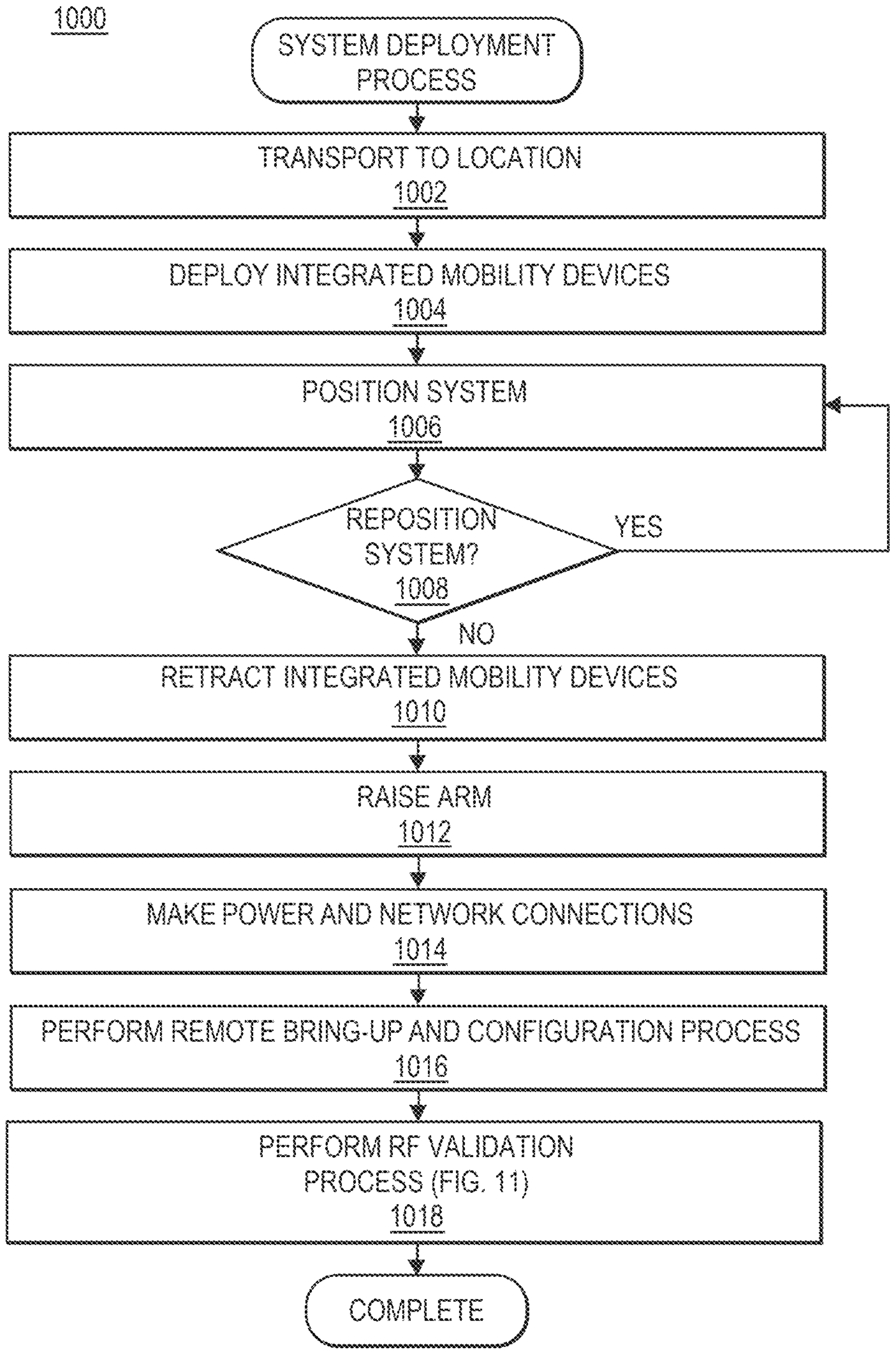
FIG. 10 is a flow diagram of an exemplary system deployment process, according to exemplary embodiments of the present disclosure.

FIG. 10 is a flow diagram of an exemplary system deployment process 1000, according to exemplary embodiments of the present disclosure.

As shown in FIG. 10, process 1000 may begin with transporting a mobile RFID exit system to a facility in which it is to be deployed, as in step 1002. This may include, for example, any retail facility or other material handling facilities. After the mobile RFID exit system is transported to the facility, in step 1004, integrated mobility elements may be deployed to facilitate positioning of the mobile RFID exit system within the facility. In exemplary implementations, the integrated mobility elements may include, for example, caster wheel that may be articulated using a jack mechanism between a retracted position (e.g., within an enclosure of the mobile RFID exit system) and an extended (e.g., deployed) position.

In the exemplary implementation where the mobility elements include integrated caster wheels that may be articulated using a jack mechanism, this may include articulating the caster wheels into the extended position using the jack mechanism. After the mobility elements have been deployed, the mobile RFID exit system may be positioned in the facility, as in step 1006, and in step 1008 it may be determined whether the mobile RFID exit system should be repositioned. If the mobile RFID exit system is to be repositioned, process 1000 may return to step 1008, otherwise, the mobility elements may be retracted, as in step 1010. For example, in the exemplary implementation where the mobility elements include integrated caster wheels that may be articulated using a jack mechanism, this may include articulating the caster wheels into the retracted position using the jack mechanism.

After the mobile RFID exit system is properly positioned, an arm of the mobile RFID exit system may be raised. For example, this may include articulating the arm from a lowered, secured position for transport, to a raised position (e.g., as shown in FIG. 7B). In step 1014, network and power connections may be made. Preferably, each mobile RFID exit system lane includes a single AC power cable that may be plugged into a standard 120V or 240V socket and the mobile RFID exit system includes a pre-configured wireless networking access point that may automatically join a wireless network that may be deployed in connection with the mobile RFID exit system. Then, as in step 1016, a bring up and/or configuration procedure may be performed, either remotely or locally, and an RF validation and/or verification process may be performed, as in step 1018.

Figure 11:
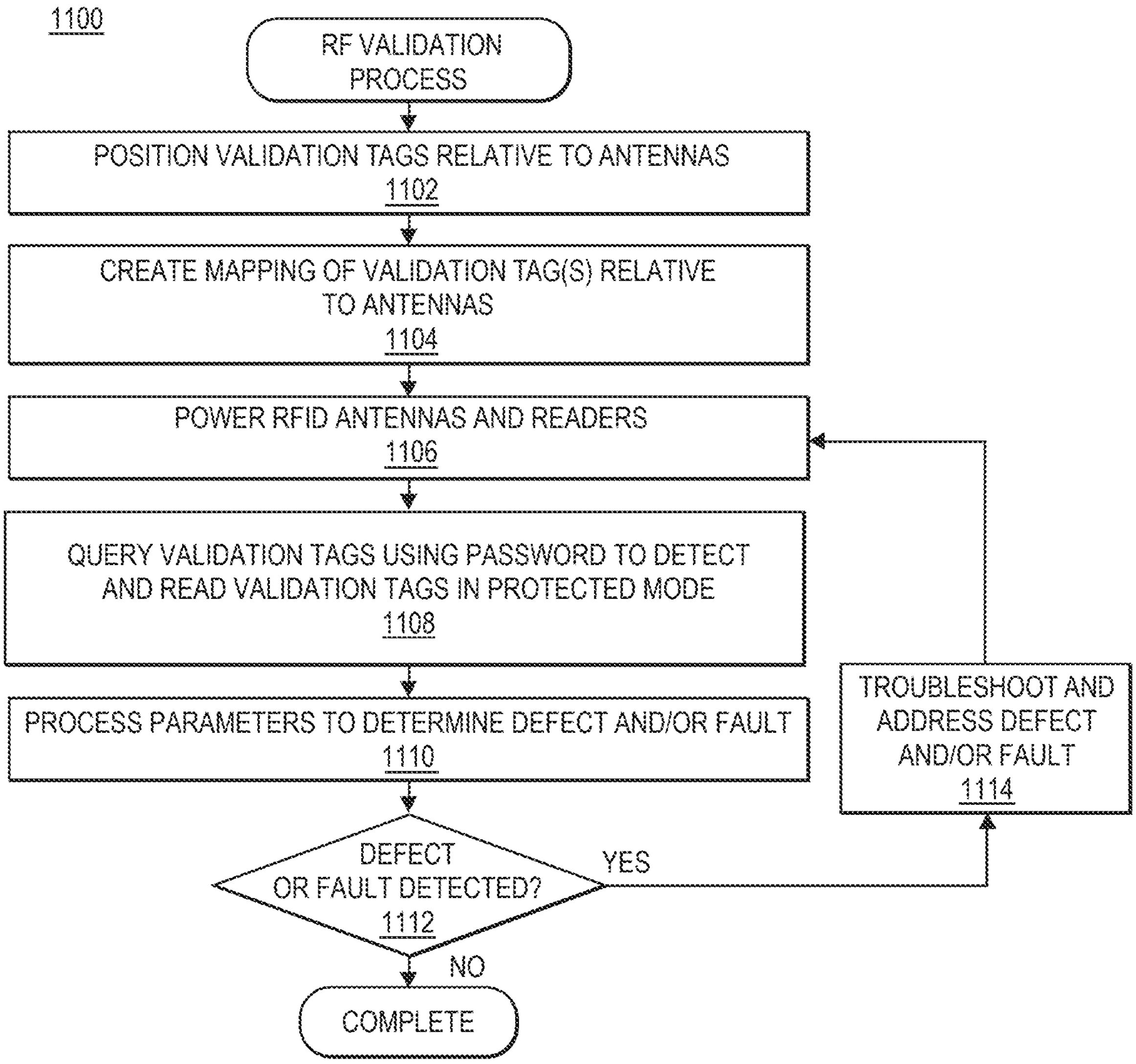
FIG. 11 is a flow diagram of an exemplary RF validation process, according to exemplary embodiments of the present disclosure.

FIG. 11 is a flow diagram of an exemplary RF validation process 1100, according to exemplary embodiments of the present disclosure.

As shown in FIG. 11, process 1100 may begin by positioning and/or arranging RFID validation tags at particular locations within the mobile RFID exit system, as in step 1102. For example, the RFID validation tags may be distributed throughout the mobile RFID exit system with sufficient spacing relative to each other and/or at particular locations relative to RFID reader antennas included in the mobile RFID exit system so that each RFID validation tag can be differentiated based on the response from each tag. In step 1104, based on the positioning of the RFID validation tags, a mapping of the position of each RFID validation tags relative to one another and/or relative to the RFID reader antennas may be determined and maintained. For example, mapping may indicate the relative distances from each RFID validation tag to each RFID reader antenna, expected signal strength values (e.g., relative or absolute) for each RFID validation tag for each RFID reader antenna, and the like.

In steps 1106 and 1108, the RFID reader antennas may be powered to detect and read the RFID validation tags. In particular, the RFID validation tags may be configured in protective mode so that RFID validation tags are essentially invisible to RFID readers that do not include the correct password in connection with the query. Accordingly, the RFID reader antennas may query the RFID validation tags with the proper password for reading the RFID validation tags in protective mode. In exemplary implementations, this may include powering the RFID reader antennas for a period of time to perform a frequency sweep over numerous channels. During this period of time, various information and parameters, such as read counts and signal strength values (e.g., RSSI, etc.), may be collected in connection with the detection and reading of the RFID validation tags. In step 1110, the various information and parameters may be processed to determine faults and facilitate troubleshooting of the RFID subsystem. For example, for a particular antenna of the RFID reader antennas under test, the signal strength values in connection with each RFID validation tag (and the mapping of the position of each RFID validation tag) may be processed to determine whether the antenna under test in operating properly.

In an exemplary implementation where a particular RFID reader antenna is being tested, an RSSI value may be measured for each read of each RFID validation tag. Optionally, for each RFID validation tag, the RSSI values measured in connection with each RFID validation tag may be combined into an average RSSI value for each RFID validation tag. Accordingly, in connection with the testing of the particular RFID reader antenna, an RSSI value may be determined for each RFID validation tag. The RSSI values for the RFID validation tags may then be processed to determine whether the particular RFID reader antenna is operating in accordance with defined specifications. For example, for each RFID validation tag, it may be determined whether the corresponding RSSI value is within a predetermined range. Assuming that the RSSI value falls within the predetermined range, it can be assumed that the particular RFID reader antenna is operating in accordance with the defined specifications. Additionally, the RSSI values for the RFID validation tags can be compared against each other to determine relative RSSI values for the RFID validation tags. Accordingly, in testing the particular RFID reader antenna, it may be expected that the RSSI value associated with the RFID validation tag that is closest would be highest relative to the RSSI values associated with the other RFID validation tags. Based on this processing, it may be determined whether a fault or defect is detected, as in step 1112. If a fault or defect was detected, troubleshooting and/or addressing the fault or defect may be performed, as in step 1114, and process 1100 may return to step 1106.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Persons having ordinary skill in the field of computers, communications, media files, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some, or all of the specific details and steps disclosed herein.

Aspects of the disclosed system may be implemented as a computer method or as an article of manufacture such as a memory device or non-transitory computer-readable storage medium. The computer-readable storage medium may be readable by a computer and may comprise instructions for causing a computer or other device to perform processes described in the present disclosure. The computer-readable storage media may be implemented by a volatile computer memory, non-volatile computer memory, hard drive, solid-state memory, flash drive, removable disk and/or other media. In addition, components of one or more of the modules and engines may be implemented in firmware or hardware.

The data and/or computer-executable instructions, programs, firmware, software and the like (also referred to herein as "computer-executable" components) described herein may be stored on a computer-readable medium that is within or accessible by computers or computer components such as computing resource 140 or to any other computers or control systems, and having sequences of instructions which, when executed by a processor (e.g., a central processing unit, or "CPU"), cause the processor to perform all or a portion of the functions, services and/or methods described herein. Such computer-executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer-executable program product that includes a transitory machine-readable signal (in compressed or uncompressed form).

As used herein, the terms "product" or "item," or like terms, may be used to refer to any good or service associated with a brand, and which may be depicted or referenced in one or more visual assets or audio content, or may be the subject of one or more advertisement creatives or other creative works. For example, products may include commercial goods, e.g., tangible objects that may be bought or sold, such as automobiles, books, clothing, computers, furniture, luggage, or others, as well as services, e.g., business services, social services, or personal services, such as travel, cruises, hair salons, personal training, legal or accounting services, or others.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow chart shown in FIGS. 9-11, orders in which such methods or processes are presented are not intended to be construed as any limitation on the claimed inventions, and any number of the method or process steps or boxes described herein can be combined in any order and/or in parallel to implement the methods or processes described herein. Additionally, it should be appreciated that the detailed description is set forth with reference to the accompanying drawings, which are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A mobile radio frequency identification (RFID) exit system, comprising:

a first lane enclosure and a second lane enclosure, the first lane enclosure and the second lane enclosure coupled to a lane floor support and arranged to form a lane therethrough; and an arm that extends above the lane and is coupled to one of the first lane enclosure or the second lane enclosure, wherein:

the first lane enclosure includes:

a first plurality of RFID reader antennas;

a first plurality of RF attenuating elements; and a first plurality of RFID validation tags;

the second lane enclosure includes:

a second plurality of RFID reader antennas;

a second plurality of RF attenuating elements; and a second plurality of RFID validation tags; and the arm includes:

a third RFID reader antenna, wherein:

the first plurality of RFID reader antennas, the second plurality of RFID reader antennas, and the third RFID reader antenna are configured to read RFID tags located within the lane;

the first plurality of RF attenuating elements and the second plurality of RF attenuating elements are configured to constrain RF energy emitted by the first plurality of RFID reader antennas, the second plurality of RFID reader antennas, and the third RFID reader antenna within the lane so that RFID tags located outside the lane are not read; and the first plurality of RFID validation tags and the second plurality of RFID validation tags are read by the first plurality of RFID reader antennas, the second plurality of RFID reader antennas, and the third RFID reader antenna during a validation procedure to verify an operation of at least one of the first plurality of RFID reader antennas, the second plurality of RFID reader antennas, or the third RFID reader antenna.

2. The mobile RFID exit system of claim 1, wherein:

the first plurality of RF attenuating elements includes:

a first plurality of RF absorbing foam;

a first RF shield that extends above the first lane enclosure; and a first metal case of the first lane enclosure; and the second plurality of RF attenuating elements includes:

a second plurality of RF absorbing foam;

a second RF shield that extends above the second lane enclosure; and a second metal case of the second lane enclosure.

3. The mobile RFID exit system of claim 1, wherein:

a first orientation of the first plurality of RFID reader antennas and a second orientation of the second plurality of RFID reader antennas are adjustable.

4. The mobile RFID exit system of claim 3, wherein the first plurality of RFID reader antennas and the second plurality of RFID reader antennas are dynamically adjustable based at least in part on a position of a user.

5. The mobile RFID exit system of claim 1, further comprising:

a control system configured to generate a cart of items based at least in part on at least one of:

product information encoded in a plurality of RFID tags read by the first plurality of RFID reader antennas, the second plurality of RFID reader antennas, and the third RFID reader antenna;

signal strength values measured in reading the plurality of RFID tags; and changes in the signal strength values as the plurality of RFID tags move through the lane of the mobile RFID exit system.

6. The mobile RFID exit system of claim 5, wherein generating the cart includes:

determining, based at least in part on the signal strength values and the changes in the signal strength values, that a first RFID tag from the plurality of RFID tags is outside the mobile RFID exit system; and excluding a first item associated with the first RFID tag from the cart.

7. A radio frequency identification (RFID) system, comprising:

a plurality of RFID reader antennas arranged in a mobile RFID exit lane and configured to read first RFID tags affixed to items being carried through the mobile RFID exit lane;

a plurality of RF attenuating elements arranged in the mobile RFID exit lane and configured to contain RF energy emitted by the plurality of RFID reader antennas within the mobile RFID exit lane to prevent the plurality of RFID reader antennas from reading second RFID tags located outside the mobile RFID exit lane; and a plurality of RFID validation tags arranged in the mobile RFID exit lane and configured to be read by the plurality of RFID reader antennas during a RF validation procedure to verify an operation of the plurality of RFID reader antennas.

8. The RFID system of claim 7, wherein the plurality of RF attenuating elements includes at least one of:

RF absorbing foam;

a transparent RF shield extending above the mobile RFID exit lane; or a metal case for the mobile RFID exit lane.

9. The RFID system of claim 8, wherein the transparent RF shield includes a first RF shielding film having a first metalized film attached to a first side of a transparent panel.

10. The RFID system of claim 9, wherein the transparent RF shield further includes a second RF shielding film having a second metalized film attached to a second side of the transparent panel.

11. The RFID system of claim 7, wherein the plurality of RFID validation tags are configured in a protected mode that configures the plurality of RFID validation tags to only respond to queries having a defined password.

12. The RFID system of claim 11, wherein the plurality of RFID validation tags are arranged at locations relative to the plurality of RFID reader antennas and a mapping of the locations of the plurality of RFID validation tags relative to the plurality of RFID reader antennas is determined.

13. The RFID system of claim 12, wherein:

a first RFID validation tag of the plurality of RFID validation tags is positioned behind a corresponding first RFID reader antenna of the plurality of RFID reader antennas; and a second RFID validation tag of the plurality of RFID validation tags is positioned across the mobile RFID exit lane from a corresponding second RFID reader antenna of the plurality of RFID reader antennas.

14. The RFID system of claim 12, wherein the RF validation procedure includes:

powering the plurality of RFID reader antennas and querying the plurality of RFID validation tags using the defined password to read the plurality of RFID validation tags and collect a plurality of parameters associated with the reads of the plurality of RFID validation tags; and comparing the plurality of parameters against a plurality of expected parameter values based at least in part on the mapping to determine a defect with the RFID system.

15. The RFID system of claim 7, wherein a first RFID reader antenna of the plurality of RFID reader antennas is positioned in an arm that extends above the mobile RFID exit lane.

16. A computer-implemented method, comprising:

arranging a plurality of radio frequency identification (RFID) validation tags at a plurality of locations relative to a plurality of RFID reader antennas within an enclosure for a mobile RFID exit lane, wherein the plurality of RFID validation tags are in a protected mode so that the plurality of RFID validation tags only respond to queries that include a password;

determining a mapping of the plurality of locations of the plurality of RFID validation tags relative to the plurality of RFID reader antennas;

determining, based at least in part on the mapping, a plurality of expected parameter values, the plurality of expected parameter values corresponding to RF reader antenna RFID validation tag pairs;

powering the plurality of RFID reader antennas to read the plurality of RFID validation tags and collect a plurality of signal parameters associated with the reading of the plurality of RFID validation tags; and comparing the plurality of signal parameters against the plurality of expected parameter values to determine a fault in connection with at least one of the plurality of RFID reader antennas.

17. The computer-implemented method of claim 16, wherein the plurality of expected parameter values are based at least in part on a relative positioning between the plurality of RFID reader antennas and the plurality of RFID validation tags.

18. The computer-implemented method of claim 16, wherein the plurality of RFID validation tags are spaced so that the plurality of RFID validation tags can be differentiated based at least in part on the plurality of signal parameters.

19. The computer-implemented method of claim 16, wherein the enclosure for the mobile RFID exit lane includes a plurality of RF attenuating elements configured to contain RF energy emitted by the plurality of RFID reader antennas within the mobile RFID exit lane.

20. The computer-implemented method of claim 19, wherein the plurality of RF attenuating elements includes at least one of:

RF absorbing foam;

a transparent RF shield extending above the mobile RFID exit lane; or a metal case for the mobile RFID exit lane.

* * * * *